US011303546B2

(12) United States Patent
Mogaki

(10) Patent No.: US 11,303,546 B2
(45) Date of Patent: Apr. 12, 2022

(54) SERVICE SYSTEM AND CONTROL METHOD OF THE SAME

(71) Applicant: CANON KABUSHIKI KAISHA, Tokyo (JP)

(72) Inventor: Shunsuke Mogaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 748 days.

(21) Appl. No.: 15/836,533

(22) Filed: Dec. 8, 2017

(65) Prior Publication Data

US 2018/0167288 A1    Jun. 14, 2018

(30) Foreign Application Priority Data

Dec. 13, 2016  (JP) .............................. JP2016-241706

(51) Int. Cl.
| | | |
|---|---|---|
| *G06F 15/16* | (2006.01) | |
| *H04L 43/04* | (2022.01) | |
| *H04L 43/16* | (2022.01) | |
| *H04L 41/0273* | (2022.01) | |
| *G06F 9/50* | (2006.01) | |
| *G06F 9/54* | (2006.01) | |
| *H04L 67/1001* | (2022.01) | |
| *H04L 67/1004* | (2022.01) | |

(52) U.S. Cl.
CPC .............. *H04L 43/04* (2013.01); *G06F 9/505* (2013.01); *G06F 9/5077* (2013.01); *G06F 9/54* (2013.01); *H04L 41/0273* (2013.01); *H04L 43/16* (2013.01); *H04L 67/1002* (2013.01); *H04L 67/1004* (2013.01)

(58) Field of Classification Search
CPC .......... G06F 9/505; G06F 9/5077; G06F 9/54; H04L 41/0273; H04L 43/04; H04L 43/16; H04L 67/1002; H04L 67/1004
See application file for complete search history.

(56) References Cited

U.S. PATENT DOCUMENTS

| | | | |
|---|---|---|---|
| 2009/0241030 A1* | 9/2009 | von Eicken | ............. H04L 67/00 715/735 |
| 2013/0212603 A1 | 8/2013 | Cooke | |
| 2014/0282626 A1 | 9/2014 | Muguda | |
| 2015/0180863 A1* | 6/2015 | Kobayashi | .......... H04L 63/0807 726/9 |
| 2015/0365348 A1 | 12/2015 | Matsuda | |

(Continued)

FOREIGN PATENT DOCUMENTS

| | | |
|---|---|---|
| CN | 101853197 A | 10/2010 |
| CN | 101887377 A | 11/2010 |
| CN | 103618758 A | 3/2014 |

(Continued)

*Primary Examiner* — Normin Abedin
(74) *Attorney, Agent, or Firm* — Canon U.S.A., Inc. IP Division

(57) ABSTRACT

A service system includes a determining unit configured to determine an API-execution-count limiting value per virtual server on a basis of the number of the virtual servers on which a web service is implemented and an API-execution-count limiting value, and a controller configured to provide the web service or to process the call of the API as an error whether the number of times the API has been executed exceeds the API-execution-count limiting value.

16 Claims, 11 Drawing Sheets

(56) References Cited

U.S. PATENT DOCUMENTS

2016/0077897 A1    3/2016  Tsang
2016/0323187 A1*  11/2016  Guzman ............ H04L 41/0893

FOREIGN PATENT DOCUMENTS

| CN | 104168133 A   | 11/2014 |
|----|---------------|---------|
| CN | 104580489 A   | 4/2015  |
| CN | 105739917 A   | 7/2016  |
| CN | 105740376 A   | 7/2016  |
| EP | 2304562 A1    | 4/2011  |
| JP | 9-81401 A     | 3/1997  |
| JP | 0981401 A     | 3/1997  |
| JP | 2011-90594 A  | 5/2011  |
| JP | 2011090594 A  | 5/2011  |
| JP | 2015-125510 A | 7/2015  |
| JP | 2015125510 A  | 7/2015  |
| JP | 2016-126801 A | 7/2016  |

* cited by examiner

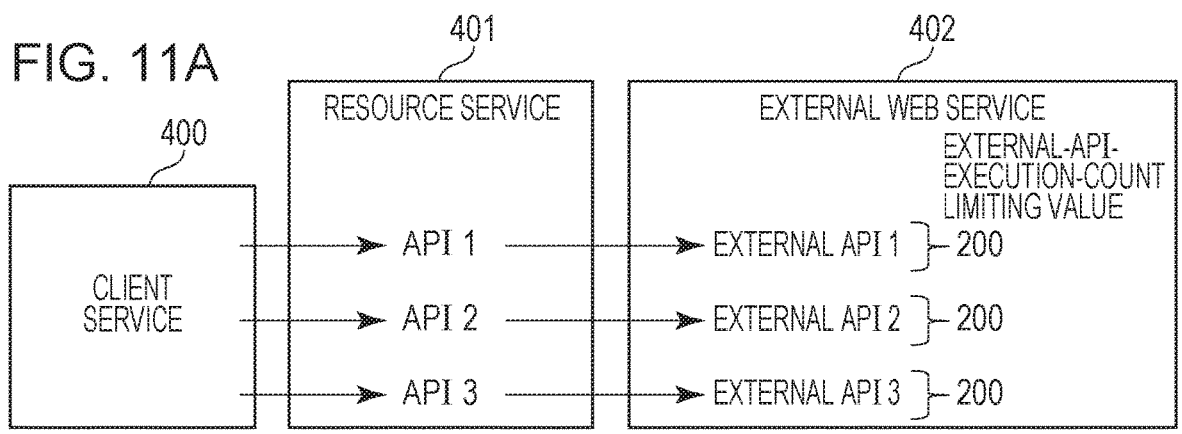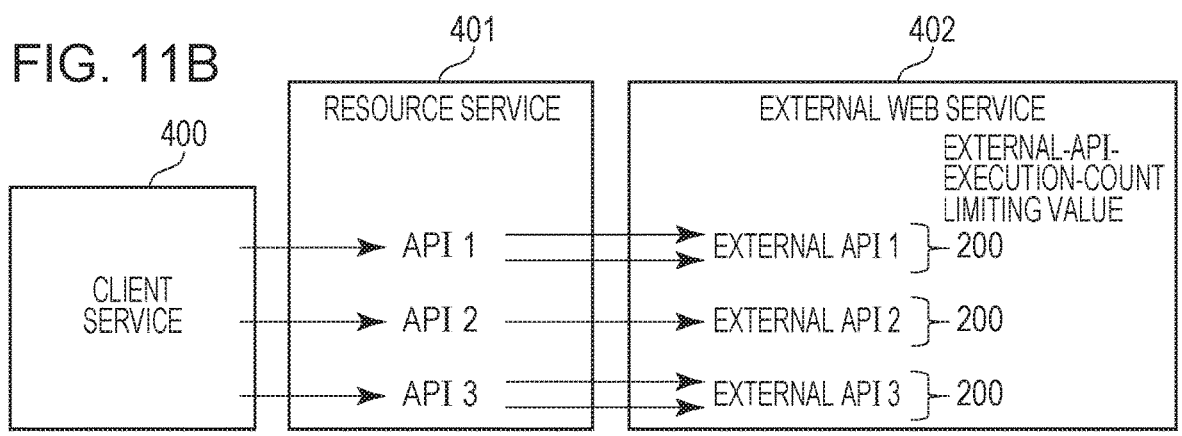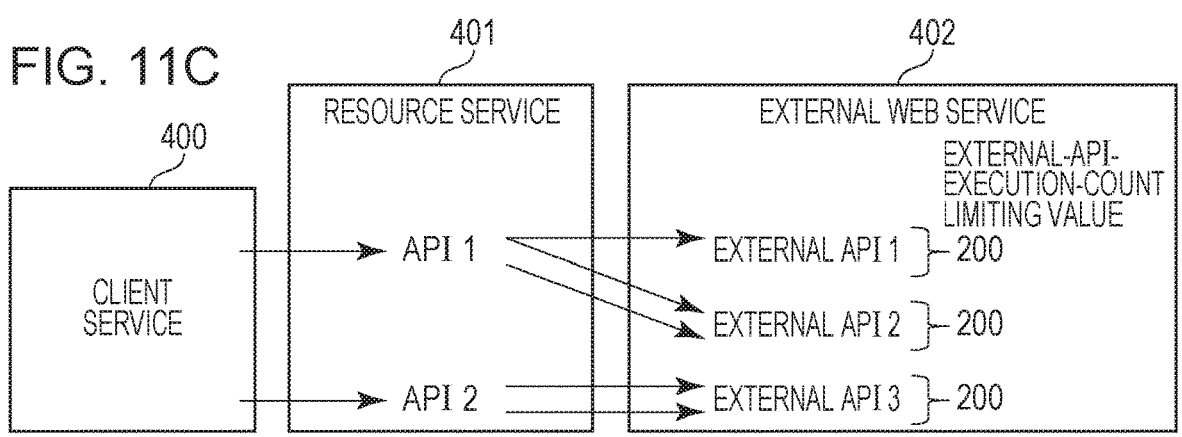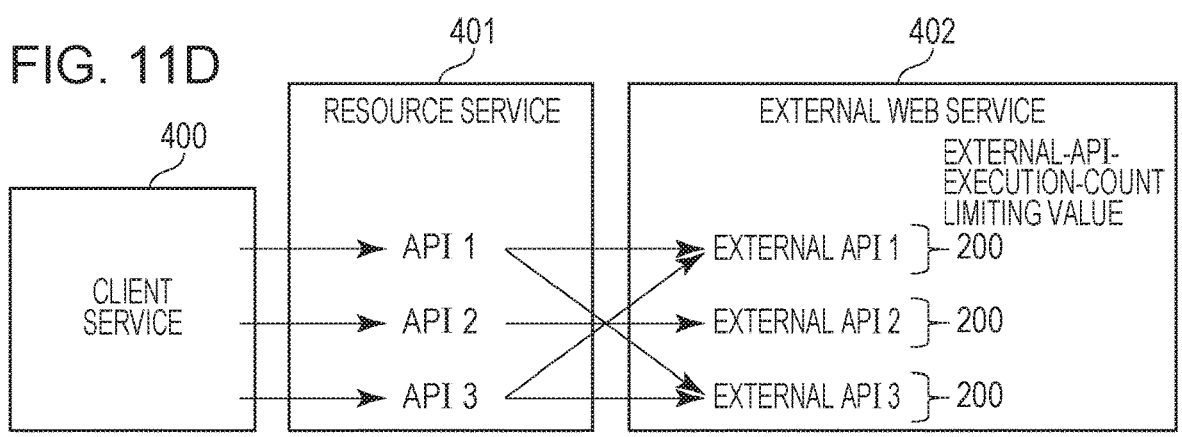

US 11,303,546 B2

SERVICE SYSTEM AND CONTROL METHOD OF THE SAME

BACKGROUND OF THE INVENTION

Field of the Invention

The present invention relates to a service system that provides a web service in response to execution of a released API, and a control method of the service system.

Description of the Related Art

In recent years, there are an increased number of cases where web services are cooperated. For example, a released web service API (Application Programming Interface) is used to cooperate web services with each other, which is called a mashup. In this case, a cooperating web service executes an API released by a cooperated web service to use the cooperated web service so that the web services are cooperated with each other.

One of conventional techniques of the web services is a function called an API throttling. In the web services, an API execution count that is possible per unit time is limited to inhibit many APIs from being executed from client services ranging from services in user terminals to the other web services. Some web services impose penalty such as temporary prohibition of the use of the web services on a client in the case where the execution count of an API executed by the client exceeds the limitation. Japanese Patent Laid-Open No. 2016-126801 discloses an electronic system that processes large data by using the API throttling function.

Another of conventional techniques of the web services is a technique that enables virtual servers to provide a web service. The virtual servers are logical computers each including an independent OS, into which a physical server computer group is divided by virtualization technology.

In the case where a web service that virtual servers provide has the API throttling function, each virtual server does not have a mechanism to automatically determine a limiting value of execution count of an API executable by the virtual server (referred to below as an API-execution-count limiting value).

SUMMARY OF THE INVENTION

The present invention provides a service system that automatically determines a new API-execution-count limiting value per virtual server and enables a user to solve trouble of manually determining the API-execution-count limiting value.

Automatic determination of the API-execution-count limiting value per virtual server enables a user to solve trouble of manually determining the API-execution-count limiting value.

The present invention provides a service system that implements a web service on virtual servers and that provides the web service in response to a call of a released API from a client service includes a determining unit configured to determine an API-execution-count limiting value per virtual server on a basis of the number of the virtual servers on which the web service is implemented and an API-execution-count limiting value that is used to limit how many times the API is executed, and a controller configured to provide the web service or to process the call of the API as an error whether the number of times the API has been executed exceeds the API-execution-count limiting value.

Further features of the present invention will become apparent from the following description of exemplary embodiments with reference to the attached drawings.

BRIEF DESCRIPTION OF THE DRAWINGS

FIGS. 11A, 11B, 11C, and 11D illustrate image views of the second, third, and fourth embodiments (second pattern) of the present invention.

DESCRIPTION OF THE EMBODIMENTS

The best mode for carrying out the present invention will be hereinafter described by using embodiments. Each of the embodiments of the present invention described below can be implemented solely or as a combination of a plurality of the embodiments or features thereof where necessary or where the combination of elements or features from individual embodiments in a single embodiment is beneficial. A web service is a function or a function group provided by a web application that runs on a server computer building a service system. According to the present invention, the web service is implemented on virtual servers. The virtual servers are logical computers each including an independent OS, into which a physical server computer group is divided by virtualization technology.

Figure 1:
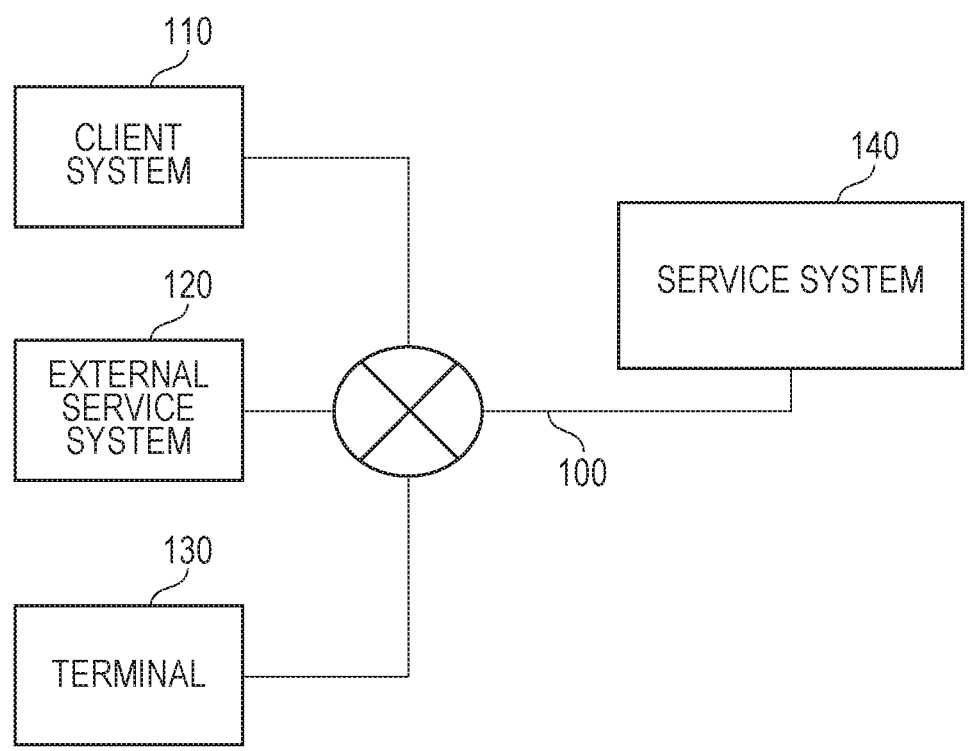
FIG. 1 illustrates an entire service system.

A service system 140 according to the present embodiment and devices configuring a network thereof will be described with reference to FIG. 1. FIG. 1 illustrates a state where a client system 110, another service system 120, or a terminal 130 is connected to a server computer or a server computer group building the service system 140 via the Internet 100. The client system 110 is a service system that executes APIs released by the service system 140. The service system 120 is a service system used by a web service performed through each API and provides a web service that, during a mashup, cooperates with the web service using the service system. It is assumed that the terminal 130 is a PC on which a web browser is installed, a portable terminal such as a smart phone or a tablet, or an image-forming apparatus. In the following description, the term simply referred to as an API represents an API released by the service system 140, and the term referred to as an external API represents an API released by the service system 120.

Figure 2:
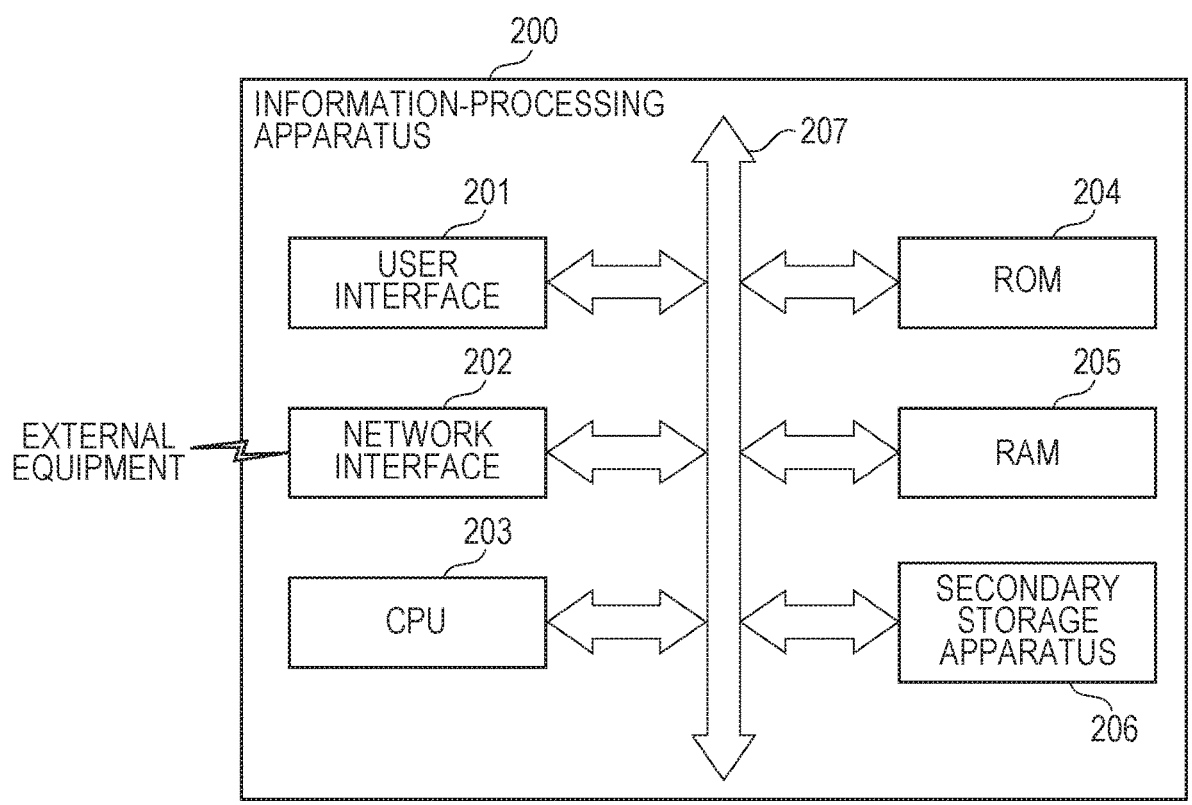
FIG. 2 illustrates the inner structure of an information-processing apparatus.

The internal structure of an information-processing apparatus 200, which is a server computer building the service system 140 illustrated in FIG. 1, will now be described with reference to FIG. 2. FIG. 2 is a block diagram illustrating the internal structure of the information-processing apparatus 200. A user interface 201 is hardware that inputs and outputs information by using, for example, a display, a keyboard, or a mouse. A computer that does not include this hardware can be connected and operated from another computer by using, for example, a remote desktop.

A network interface 202 is hardware that is connected to a network such as a LAN and that communicates with another computer or a network device. A CPU 203 is a unit that loads a program from a ROM 204, a RAM 205, or a secondary storage apparatus 206 and executes instructions of the program to control the information-processing apparatus 200.

The ROM 204 is a storage apparatus in which an application program, an embedded program including OS, and data, for example, are stored. The RAM 205 is a work memory used when the CPU 203 executes the instructions. The programs stored in the ROM 204 are loaded into the RAM 205. The CPU 203 successively reads the instructions of the program and executes the instructions. The secondary storage apparatus 206 is an external storage apparatus represented by a HDD. These components are connected to each other with an input/output interface 207 interposed therebetween.

The information-processing apparatus 200 of the service system 140 is described above. The server computer building the service system 120 and the terminal 130 have the same structure as the information-processing apparatus 200.

What deserves special mention here is that the application program stored in the secondary storage apparatus 206 is loaded into the RAM 205, and thus, the terminal 130 implements the function of the web browser. A user accesses the web service by using the web browser and operates the screen of the web service to cause the web browser to execute the API. Consequently, the user can use the web service of the service system 140 by using the terminal 130. That is, the web service is also used in another manner other than the mashup.

The function of implementing the web service will now be described with reference to FIG. 3. In the following description, virtual servers each has an auto scaling function. According to the present invention, however, each virtual server may not have the auto scaling function. The auto scaling function is a function of automatically increasing or decreasing the number of the virtual servers in accordance with the load of the service system 140. The auto scaling function prevents performance degradation in a manner in which the number of the virtual servers is increased when the load of the service system is increased to a predetermined load or more, and decreases operating costs of the virtual servers in a manner in which the number of the virtual servers is decreased when the load is equal to or less than a predetermined load. According to the embodiment, an auto scaling group 303, described later, implements the auto scaling function.

Figure 3:
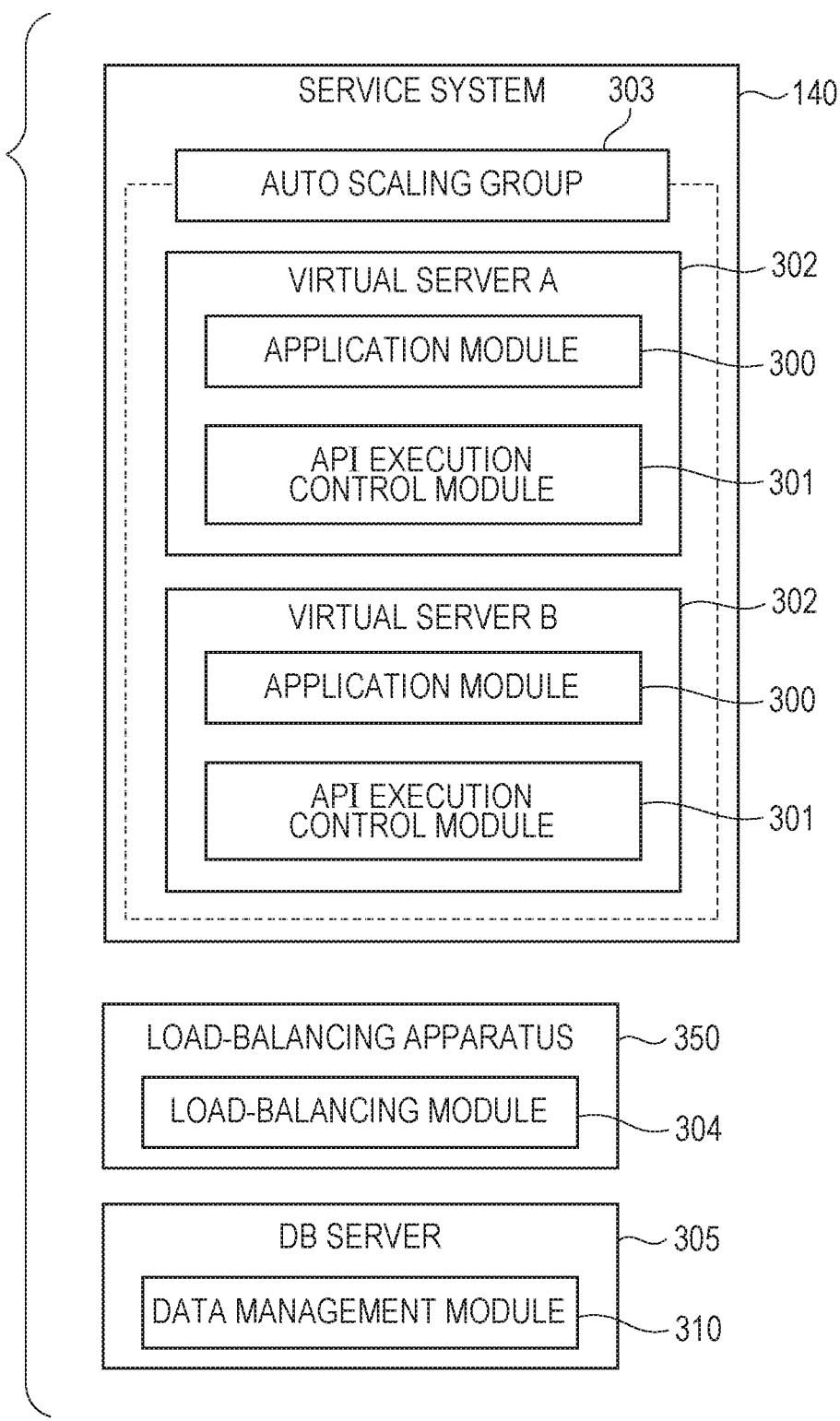
FIG. 3 is a block diagram of the function of each apparatus.

FIG. 3 is a block diagram illustrating module groups in a load-balancing apparatus 350, a DB server 305, and virtual servers 302 that the auto scaling group 303 manages. The virtual servers 302 are implemented in a manner in which a program for implementing the virtual servers 302 that is embedded in the ROM 204 is loaded into the RAM 205. A part or the whole of the RAM 205 is used to implement the virtual servers 302. Each of the virtual servers 302 includes a virtual secondary storage apparatus, a virtual RAM, and a virtual ROM and loads programs stored in the virtual secondary storage apparatus into the virtual RAM to implement an application module 300 and an API execution control module 301. The application module 300 and the API execution control module 301 implement the web service.

In some cases, the virtual servers 302 are implemented by a single server computer. It can also be thought that server computers implement a single virtual server. In FIG. 3, the auto scaling group 303 includes two virtual servers 302. However, it can be thought that the auto scaling group 303 includes a single virtual server 302 or three or more virtual servers 302.

Each application module 300 has a function of implementing the web service, releases APIs for performing the web service to the outside, and provides the web service in response to an execution request from the client system 110 or the terminal 130. It is assumed that the web service according to the first embodiment is an authentication and approval service that performs an authentication and approval process when another web service implemented on a cloud system is used. The web service, however, is not limited thereto. The web service is thought to be a business form service that processes data to create business form data, a print service that processes data to create print data, a printer management service that manages information about a printer and that processes data to create report data, or another service. The web service implemented by the application module 300 can execute external APIs released by the DB server 305 or the service system 120. The application module 300 performs its own web service by using the result of execution of an external API to enable the mashup.

The auto scaling group 303 is a function of monitoring the number of the virtual servers 302, increases or decreases the number of the virtual servers 302 if necessary, and manages the result of the increase or decrease. The auto scaling group 303 is implemented in a manner in which a program stored in the ROM 204 is loaded into the RAM 205, instructions are successively read from the program loaded into the ROM 205, and the instructions are executed.

The auto scaling group 303 monitors the load of the virtual servers 302 that the auto scaling group 303 manages, increases the number of the virtual servers 302 when the load increases, and decreases the number of the virtual servers 302 when the load decreases. Increasing or decreasing the number of the virtual servers 302 on the basis of the monitoring result of the load is referred to as auto scaling. According to the present invention, checking the load means monitoring consumption of resources such as CPU usage and memory usage in the virtual servers 302 and the number of accesses receivable by the virtual servers 302 to grasp the state of the load. A decision method when the auto scaling group 303 changes the number of the virtual servers 302 is not limited to the method of monitoring the load of the virtual servers 302. For example, in the case where requests handled by the virtual servers 302 are stored in a queue, a method of monitoring the number of jobs stored in the queue is thought, in addition to monitoring of the number of accesses to a load-balancing module 304 described later.

The load-balancing module 304 provides a function of distributing and delivering requests sent via the Internet 100 to the virtual servers 302. A specific example of the load-balancing module 304 is a SLB (Server Load Balancer). The load-balancing module 304, however, may be implemented on a service system that differs from the service system 140. The service system 140 may have the same function as the load-balancing apparatus 350. The load-balancing module 304 is implemented in a manner in which a program stored in the secondary storage apparatus 206 is loaded into the RAM 205. The DB (Data Base) server 305 manages data that the virtual servers 302 use. The DB server 305 may be provided on the virtual servers 302 or may be provided by another service system connected via an intranet, not illustrated.

The DB server 305 includes a data management module 310. The DB server 305 loads a program stored in the secondary storage apparatus 206 into the RAM 205 to implement the data management module 310. The data management module 310 is implemented to manage data used by the web service and decide access permission, that is, whether the web service that requests access can access the data. The DB server 305 is not essential. Data needed to implement the function of an API can be acquired from the service system 120 instead of the DB server 305.

The API execution control module 301 decides whether the APIs released by the web service are executable in response to execution request and provides the API throttling function of controlling the execution of the APIs on the basis of the result. The API execution control module 301 loads a program stored in the secondary storage apparatus 206 into the RAM 205 to implement the API throttling function to be provided. The API execution control module 301 manages an API-execution-count limiting value of each API per unit time. According to the present invention, an API execution count is the total number of times that is counted after the API is executed. For example, once the API is executed, "1" is stored. The API execution control module 301 compares the API-execution-count limiting value and the API execution count, the execution of the API is prepared when the API execution count is less than the API-execution-count limiting value, and the call of the API is processed as an error when the API execution count exceeds the API-execution-count limiting value. A method of deciding the API execution count will be described later with reference to FIG. 5. The API execution count and the API-execution-count limiting value may not be compared for all the APIs released by the web service. In some cases, when a specific API is called, the API execution count of the specific API and the API-execution-count limiting value are compared. In examples described according to the embodiments below, the API execution count and the API-execution-count limiting value are compared for all the APIs released by the web service.

In the case where the web service executes the DB server 305 or the external API, there is a possibility that the DB server 305 or the service system 120 cannot finish performing requested processes. In preparation for this case, the execution count of APIs of the web service itself is limited. The limitation of the execution of the APIs is not necessarily assumed for only cooperation with the outside. According to the present invention, the virtual servers 302 perform API throttling to prevent the API execution count from exceeding the API-execution-count limiting value and prevent a large surplus of the API execution count even when the number of the virtual servers 302 is changed by the auto scaling.

It is not necessary for the API-execution-count limiting value to be a value in consideration for the upper limit that the DB server 305 and the service system 120 can permit, nor to be the upper limit itself. For example, in the case where the execution count of an API executable per unit time is 100 times in consideration for the specification of the service system 120, the API-execution-count limiting value may not be "100" but may be "75". In the case where the API-execution-count limiting value is an API-execution-count limiting value of "100" as it is, it can be thought that, once the API execution count exceeds an API-execution-count limiting value of "100", the service system 120 imposes penalty on the web service. Accordingly, the limiting value has a margin. The present invention, however, can be carried out in the case where the API-execution-count limiting value is "100" as it is.

A first embodiment, which is a basic embodiment of the present invention, will be described. A flow when an API is executed will now be described with reference to FIG. 4. The processes of APIs are executed independently on the virtual servers 302. In some cases where the web service is a function group, plural APIs are released. In the case considered according to the first embodiment, the web service provided by each application module 300 releases three APIs of "API 1", "API 2", and "API 3". Table 1 illustrates the API-execution-count limiting value that the API execution control module 301 manages. The API-execution-count limiting value illustrated in Table 1 is predetermined by a user in consideration for the execution limiting value of the DB server 305 when the service system 140 is built, and the API execution control module 301 stores the predetermined value.

TABLE 1

API-Execution-Count Limiting Value of Web Service Set in Service System 140 in Advance

| API | API-EXECUTION-COUNT LIMITING VALUE |
|---|---|
| API 1 | 100 |
| API 2 | 50 |
| API 3 | 100 |

Figure 4:
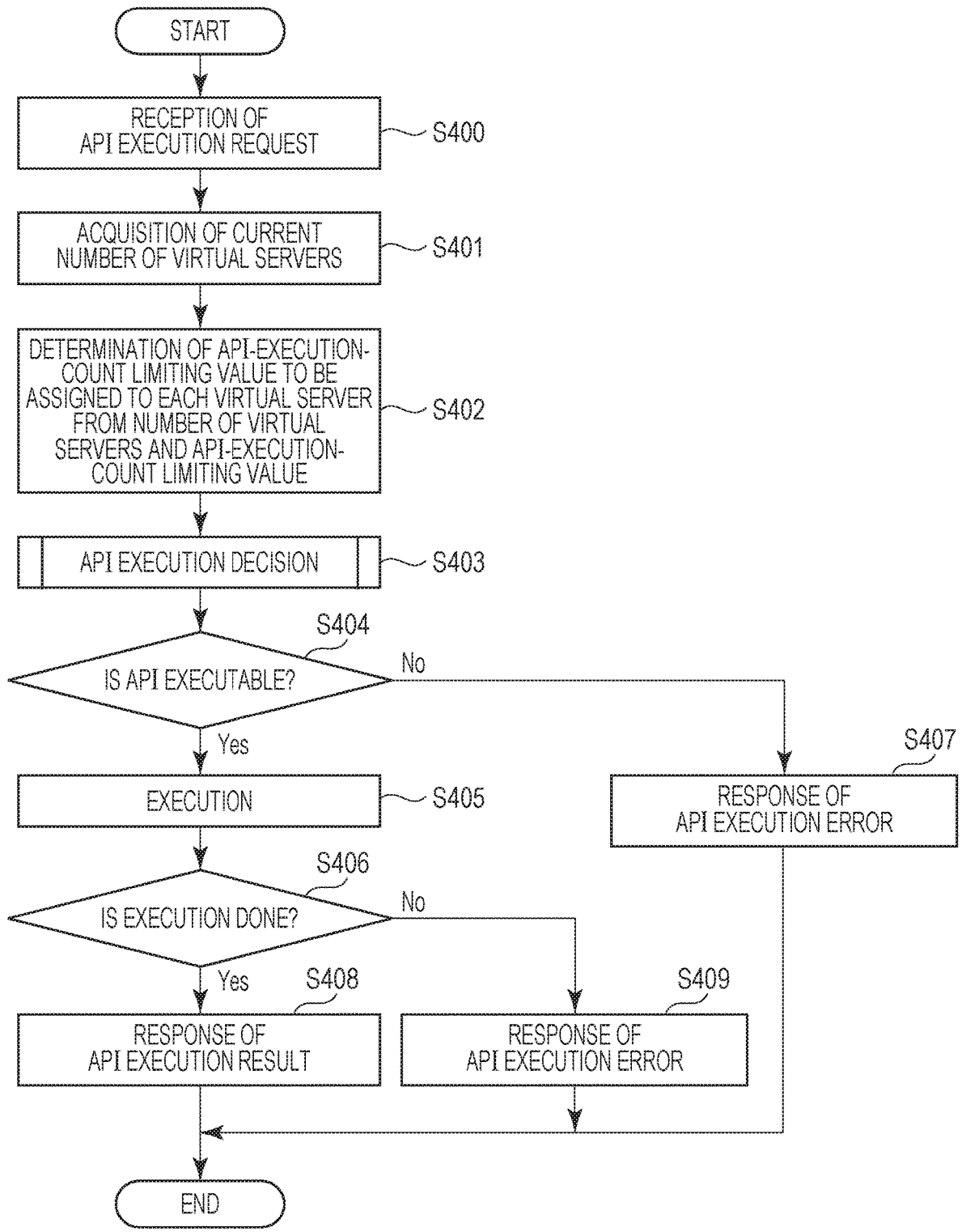
FIG. 4 is a flow chart illustrating the flow of processes according to a first embodiment of the present invention.

The flow in FIG. 4 begins when each virtual server 302 starts, when each virtual server 302 receives an API execution request from the client system 110 or the terminal 130, or when each virtual server 302 periodically performs the flow in FIG. 4. In an example illustrated in FIG. 4, the flow begins when each virtual server 302 receives the API execution request at S400.

At S401, the current number of the virtual servers is acquired. This time, the API execution control module 301 acquires the number of the virtual servers 302 that are running, which the auto scaling group 303 manages, and checks the number. The method of acquiring the current number of the virtual servers 302 is not limited thereto. For example, the number of the virtual servers 302 that the load-balancing module 304 manages as destinations of distribution may be acquired from the load-balancing module 304 and checked. The number of the virtual servers 302 may be checked when the API-execution-count limiting value per virtual server 302 is determined (or updated), or the number may be periodically checked, which makes no problem.

According to the first embodiment, the virtual servers 302 are currently two of a "virtual server A302" and a "virtual server B302". Table 2 illustrates the number of the virtual servers 302 that the API execution control module 301 manages.

TABLE 2

| NUMBER OF VIRTUAL SERVERS 302 |
|---|
| 2 |

At S402, the API execution control module 301 calculates and determines a new API-execution-count limiting value to be assigned to each virtual server 302 on the basis of the number of the virtual servers 302 and the API-execution-count limiting value. Specifically, the API-execution-count limiting value illustrated in Table 1 is divided by the number of the virtual servers 302 illustrated in Table 2, and the result value is determined as the new API-execution-count limiting value. In an example described according to the first embodiment, the API execution control module 301 acquires the number of the virtual servers 302 from the auto scaling group 303 to check the number and calculate the number of the virtual servers 302.

However, the auto scaling group 303 may manage the number of the virtual servers 302 to calculate the new API-execution-count limiting value, and the API execution control module 301 may use the calculated result.

This time, the number of the virtual servers 302 is two, and, as illustrated in Table 3, the API-execution-count limiting value per virtual server is 50 times for the API 1, 25 times for the API 2, and 50 times for the API 3, and these values are set in the API execution control module 301.

According to the first embodiment, the API-execution-count limiting value illustrated in Table 1 is divided by the number of the virtual servers 302 illustrated in Table 2 to calculate and determine the API-execution-count limiting value per virtual server. However, the method of determining the API-execution-count limiting value is not limited to this calculation method. Unequal API-execution-count limiting values may be assigned to the virtual servers 302 and may be set as new API-execution-count limiting values. In this case, the number of the virtual servers 302 is grasped to assign unequal API-execution-count limiting values, and at least an API-execution-count limiting value of 1 or more is assigned to each virtual server 302.

TABLE 3

| API-Execution-Count Limiting Value per Virtual Server | |
|---|---|
| API | API-EXECUTION-COUNT LIMITING VALUE |
| API 1 | 50 |
| API 2 | 25 |
| API 3 | 50 |

At S403, the API execution control module 301 makes API execution decision on the basis of the result of S402. The details of S403 will be described later with reference to FIG. 5.

At S404, the API execution control module 301 decides whether the API is executable. In the case where the API is decided as being executable from the result of S403, the flow proceeds to S405, and the application module 300 executes the process of the requested API. In the case where the API is decided as being unexecutable from the result of S403, the flow proceeds to S407.

At S407, the application module 300 responds with an API execution error. Specifically, in the case where the application module 300 decides the API execution count exceeds the API-execution-count limiting value at S404, the error is responded to the client system 110 or the terminal 130 from which the API is called.

After the process of the requested API is executed at S405, the application module 300 decides whether the execution is done at S406. In the case where the application module 300 decides the execution is failed at S406, the application module 300 responds with the failure of the execution to the client system 110 or the terminal 130 at S409. In the case where the execution is done, the flow proceeds to S408, and the application module 300 responds with the execution result to the client system 110 or the terminal 130.

The API execution decision at S403 will be described in detail with reference to FIG. 5. The API execution decision is made by using the API-execution-count limiting value. In the description according to the first embodiment, the unit time is one minute. However, the unit time is not limited to this value and may be 30 seconds or one hour, for example. There are some methods for the decision flow. According to the first embodiment, a represented method thereof will be described.

Figure 5:
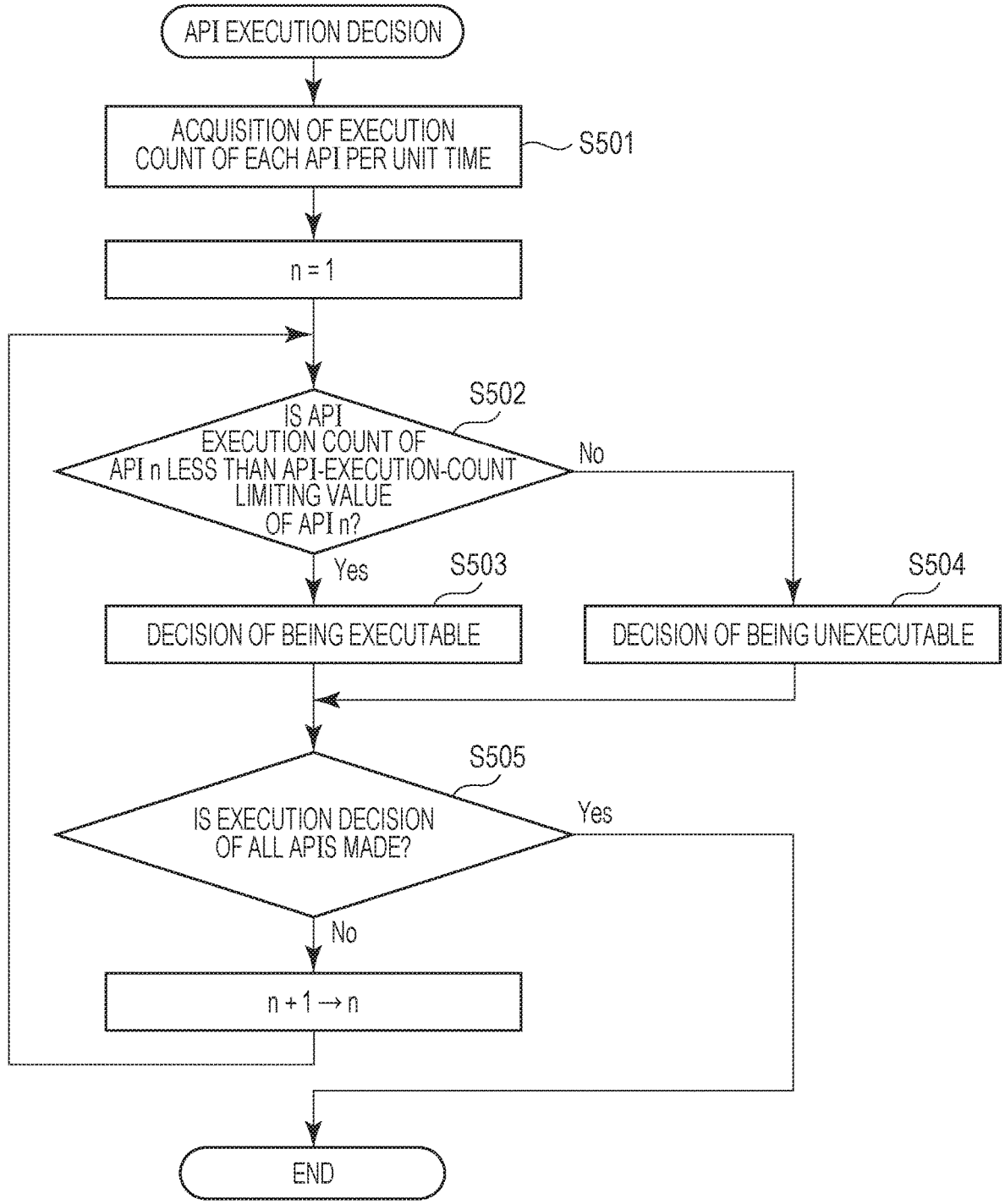
FIG. 5 is a flow chart illustrating the flow of processes according to the first embodiment of the present invention.

FIG. 5 illustrates the flow of the API execution decision in the case where current time is a reference time at which the API execution count is counted. At S501, the API execution control module 301 acquires the execution count of each API per unit time from an API execution history. This time, the API execution control module 301 acquires the API execution count from current time to one minute prior. Table 4 illustrates the API execution history. The API execution history is recorded when the application module 300 executes each API and includes the executed API and execution time.

According to the first embodiment, for example, API execution is requested at 10:00:10 on Oct. 1, 2016. The API execution control module 301 calculates the execution count of the API 1 executed from time at which the API execution is requested to one minute prior. From Table 4, the execution count of the API 1 is determined to be "3" because the API 1 has been executed 3 times from 09:59:10 on Oct. 1, 2016, which is one minute before the API execution is requested, to 10:00:10 on Oct. 1, 2016.

TABLE 4

| API Execution History | |
|---|---|
| API | time |
| API 1 | 2016/10/1 09:58:00 |
| API 3 | 2016/10/1 09:59:00 |
| API 1 | 2016/10/1 09:59:30 |
| API 1 | 2016/10/1 09:59:45 |
| API 2 | 2016/10/1 09:59:50 |
| API 1 | 2016/10/1 10:00:00 |
| API 2 | 2016/10/1 10:00:10 |
| API 2 | 2016/10/1 10:01:00 |

At S502, the API execution control module 301 compares the result of S501 and the API-execution-count limiting value of an API n that is calculated at S402 and decides whether the API execution count of the API n is less than the API-execution-count limiting value of the API n. In the case where the result of S502 is that the API execution count of the API 1 is less than the API-execution-count limiting value of the API 1, the flow proceeds to S503. In the case where the API execution count of the API 1 is equal to or more than the API-execution-count limiting value of the API 1, the flow proceeds to S504. In the case of the API 1, the API execution count of the API 1 is "3" from the result of S501 and is less than the API-execution-count limiting value of the API 1, which is "50" (see Table 3), and the flow proceeds to S503.

At S503, the API execution control module 301 makes the decision that the API n is executable. At S504, the API execution control module 301 makes the decision that the API n is unexecutable. Until the execution decision of all APIs is made at S505, S502 to S505 are repeated.

The following description illustrates the flow of the API execution decision in the case where the unit time is divided into predetermined intervals, and the API execution count is counted at the divided intervals. In the flow, instead of S501 in FIG. 5, the API execution control module 301 acquires the API execution count for the past one minute from an API execution count history of each API at regular intervals. Table 5 illustrates an example of the API execution count history of the API 1 in this case. This time, since the unit time for the API-execution-count limiting value is set to one minute, in the description in this case, the API execution count of the API 1 is counted at an interval of 15 seconds. The interval of the API execution count in this case is not limited to 15 seconds and may be any interval provided that the interval is obtained by dividing the unit time.

According to the first embodiment, for example, the API execution control module 301 receives the execution request of the API 1 at 10:00:10 on Oct. 1, 2016. The API execution control module 301 counts the API execution count of the API 1 for the past one minute on the basis of the time at which execution of the API 1 is requested. Specifically, the API execution control module 301 adds up the execution count at 09:59:15-29 on Oct. 1, 2016, at 09:59:30-44 on Oct. 1, 2016, at 09:59:45-59 on Oct. 1, 2016, and at 10:00:00-14 on Oct. 1, 2016. From Table 5, the API execution count of the API 1 is determined to be "45". The execution count is determined for a one minute period, but this is not necessarily the one minute period up to the execution request receipt time as given in the example.

TABLE 5

API Execution Count History of API 1

| TIME | API EXECUTION COUNT |
| --- | --- |
| 2016/10/1 09:58:45-59 | 10 |
| 2016/10/1 09:59:00-14 | 10 |
| 2016/10/1 09:59:15-29 | 15 |
| 2016/10/1 09:59:30-44 | 15 |
| 2016/10/1 09:59:45-59 | 10 |
| 2016/10/1 10:00:00-14 | 5 |

The flow from S502 to S505 is the same as the flow described with reference to FIG. 5, and a detailed description thereof is omitted. This time, the API execution count of the API 1 is less than the API-execution-count limiting value of the API 1, and accordingly, the API 1 is decided as being executable.

The following specific description with reference to FIG. 4 and FIG. 5 illustrates the case where the auto scaling function is performed to increase or decrease the number of the virtual servers 302. For example, the web service is provided by two virtual servers 302 of the virtual server A302 and the virtual server B302, and, in this state, a virtual server C302 is added by the auto scaling function.

After the API execution control module 301 receives the API execution request at S400, the API execution control module 301 acquires the number of the virtual servers 302 at S401. This time, the number of the virtual servers 302 is increased to three by the auto scaling function, and the acquired number of the virtual servers 302 is "3". At S402, the API-execution-count limiting value in Table 1 is divided by "3", and the API-execution-count limiting value per virtual server is decided to be 33 times for the API 1, 16 times for the API 2, and 33 times for the API 3. The API-execution-count limiting value may be distributed to each virtual server 302 in any proportion on the basis of the number of the virtual servers that are running as the new API-execution-count limiting value. This time, the API-execution-count limiting value in Table 1 is not divisible by "3", which is the number of the virtual servers 302. Accordingly, in Table 6, a remainder thereof is omitted. The remainder may be distributed to any one of the virtual servers 302. Table 6 illustrates the API-execution-count limiting value per virtual server.

TABLE 6

API-Execution-Count Limiting Value per Virtual Server

| API | API-EXECUTION-COUNT LIMITING VALUE |
| --- | --- |
| API 1 | 33 |
| API 2 | 16 |
| API 3 | 33 |

Subsequently, at S501, the API execution control module 301 acquires the API execution count from the API execution count history. This time, examples of the API execution count of the API 1 will be described. Table 7A, Table 7B, and Table 7C illustrate execution histories of the API 1 of the virtual server A302, the virtual server B302, and the virtual server C302. According to the first embodiment, for example, execution of the API 1 is requested to each virtual server 302 at 10:00:10 on Oct. 1, 2016. It can be seen that the API execution count of the API 1 from the execution request to one minute prior is 22 times for the virtual server A302 from Table 7A, and 40 times for the virtual server B302 from Table 7B. It can be seen that the virtual server C302 has never executed the API 1 from Table 7C.

TABLE 7A

API Execution Count History of API 1 of Virtual Server A302

| TIME | API EXECUTION COUNT |
| --- | --- |
| 2016/10/1 09:58:45-59 | 10 |
| 2016/10/1 09:59:00-14 | 5 |
| 2016/10/1 09:59:15-29 | 5 |
| 2016/10/1 09:59:30-44 | 15 |
| 2016/10/1 09:59:45-59 | 2 |
| 2016/10/1 10:00:00-14 | 5 |

TABLE 7B

API Execution Count History of API 1 of Virtual Server B302

| TIME | API EXECUTION COUNT |
| --- | --- |
| 2016/10/1 09:58:45-59 | 15 |
| 2016/10/1 09:59:00-14 | 15 |
| 2016/10/1 09:59:15-29 | 10 |
| 2016/10/1 09:59:30-44 | 10 |
| 2016/10/1 09:59:45-59 | 15 |
| 2016/10/1 10:00:00-14 | 5 |

TABLE 7C

API Execution Count History of API 1 of Virtual Server C302

| TIME | API EXECUTION COUNT |
|---|---|
| 2016/10/1 10:00:00-14 | 0 |

Through S502 to S505, the API execution control module 301 compares the API-execution-count limiting value in Table 6 and the API execution count in Tables 7A to 7C to decide that the virtual server A302 can execute the API, the virtual server B302 cannot execute the API, and the virtual server C302 can execute the API.

The following description illustrates the auto scaling function is performed due to a decrease in the number of accesses to the web service, and the number of the virtual servers 302 is decreased. For example, the number of the virtual servers is decreased to two (the virtual server A302 and the virtual server B302) by the auto scaling function from a state where the web service is provided by the three virtual servers 302 of the virtual server A302, the virtual server B302, and the virtual server C302.

At S400, the API execution control module 301 receives the API execution request. Subsequently, as S401, the API execution control module 301 acquires the number of the virtual servers 302. The number of the virtual servers 302 is two, and accordingly, the acquired number of the virtual servers 302 is "2".

At S402, the API execution control module 301 calculates the new API-execution-count limiting value to be assigned to each virtual server 302 on the basis of the number of the virtual servers 302 and the API-execution-count limiting value. The API-execution-count limiting value in Table 1 is divided by "2", which is the number of the virtual servers, and the new API-execution-count limiting value is determined to be 50 times for the API 1, 25 times for the API 2, and 50 times for the API 3.

Subsequently, at S501, the API execution control module 301 acquires the API execution count from the API execution count history. Table 8A illustrates the API execution count history of the API 1 of the virtual server A302. Table 8B illustrates the API execution count history of the API 1 of the virtual server B302. For example, execution of the API 1 is requested to the virtual server A302 and the virtual server B302 at 10:01:40 on Oct. 1, 2016. From Table 8A, the API execution count of the API 1 from the execution request to one minute prior is decided to be 35 times for the virtual server A302. An API-execution-count limiting value of "50" of the API 1 and an API execution count of "35" in Table 8A are compared, and it is decided that the virtual server A302 can execute the API.

In the case of the virtual server B302, from Table 8B, the API execution count of the API 1 from the execution request to past one minute is decided to be 30 times. An API execution count of "30" in Table 8B and an API-execution-count limiting value of "50" of the API 1 are compared, and it is decided that the virtual server B302 can execute the API.

TABLE 8A

API Execution Count History of API 1 of Virtual Server A302

| TIME | API EXECUTION COUNT |
|---|---|
| 2016/10/1 10:00:15-29 | 20 |
| 2016/10/1 10:00:30-44 | 5 |
| 2016/10/1 10:00:45-59 | 10 |

TABLE 8A-continued

API Execution Count History of API 1 of Virtual Server A302

| TIME | API EXECUTION COUNT |
|---|---|
| 2016/10/1 10:01:00-14 | 15 |
| 2016/10/1 10:01:15-29 | 5 |
| 2016/10/1 10:01:30-44 | 10 |

TABLE 8B

API Execution Count History of API 1 of Virtual Server B302

| TIME | API EXECUTION COUNT |
|---|---|
| 2016/10/1 10:00:15-29 | 10 |
| 2016/10/1 10:00:30-44 | 10 |
| 2016/10/1 10:00:45-59 | 5 |
| 2016/10/1 10:01:00-14 | 5 |
| 2016/10/1 10:01:15-29 | 10 |
| 2016/10/1 10:01:30-44 | 10 |

According to the first embodiment, when the auto scaling function is performed, the new API-execution-count limiting value per virtual server 302 can be calculated and the API-execution-count limiting value can be updated. Thus, even when many released APIs are executed and the load of the service system 140 increases, the auto scaling function enables requests to be handled without stopping the web service, and the throttling function enables the virtual servers 302 that are running to limit the API execution. In the case where the API execution count of the released APIs decreases, the web service can be implemented in a state where the API execution ability of the virtual servers 302 is sufficiently used.

Even in the case where the auto scaling function is not provided, the use of the present invention enables the new API-execution-count limiting value (see Table 3) of each virtual server 302 to be determined on the basis of the number (see Table 2) of the virtual servers and the predetermined API-execution-count limiting value (Table 1).

The following description illustrates a second embodiment in which the API execution control module 301 sets the new API-execution-count limiting value in the case where the web service performed through the APIs executes the external APIs.

In the case where an external-API-execution-count limiting value is set in the service system 120, and one of the external APIs is executed the number of times more than the value, the function of the service system 120 becomes unusable. The external-API-execution-count limiting value is a value to limit the total number of times (referred to below as an external API execution count) that is counted after the external API is executed. When the external API execution count exceeds the external-API-execution-count limiting value, and the function of the service system 120 becomes unusable, the API that uses the external API also becomes unusable as a result of penalty, and the service system 140 stops. For this reason, it is necessary for the API-execution-count limiting value to be set in accordance with the external-API-execution-count limiting value in the case of using the external API.

According to the present embodiment, a method of setting the API-execution-count limiting value will be described with reference to FIG. 6.

Figure 10A:
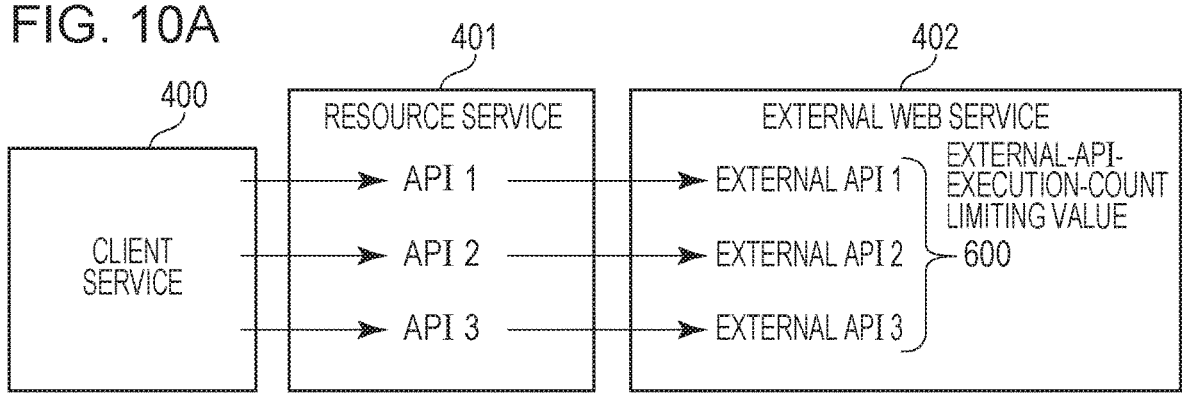
FIGS. 10A, 10B, 10C, and 10D illustrate image views of the second, third, and fourth embodiments (first pattern) of the present invention.

The API 1, the API 2, and the API 3 executed by a client service 400 perform the web service. The web service executes an external API 1, an external API 2, and an external API 3. FIG. 10A illustrates an image view thereof. A web service implemented by the client system 110 is referred to below as the client service 400. The web service implemented by the service system 140 is referred to below as a resource service 401. A web service implemented by the service system 120 is referred to below as an external web service 402 (see FIGS. 10A to 10D and FIGS. 11A to 11D). This time as an example, the client service 400 executes the APIs. However, it can be thought that the function of a web browser implemented by the terminal 130 executes the APIs.

Figure 6:
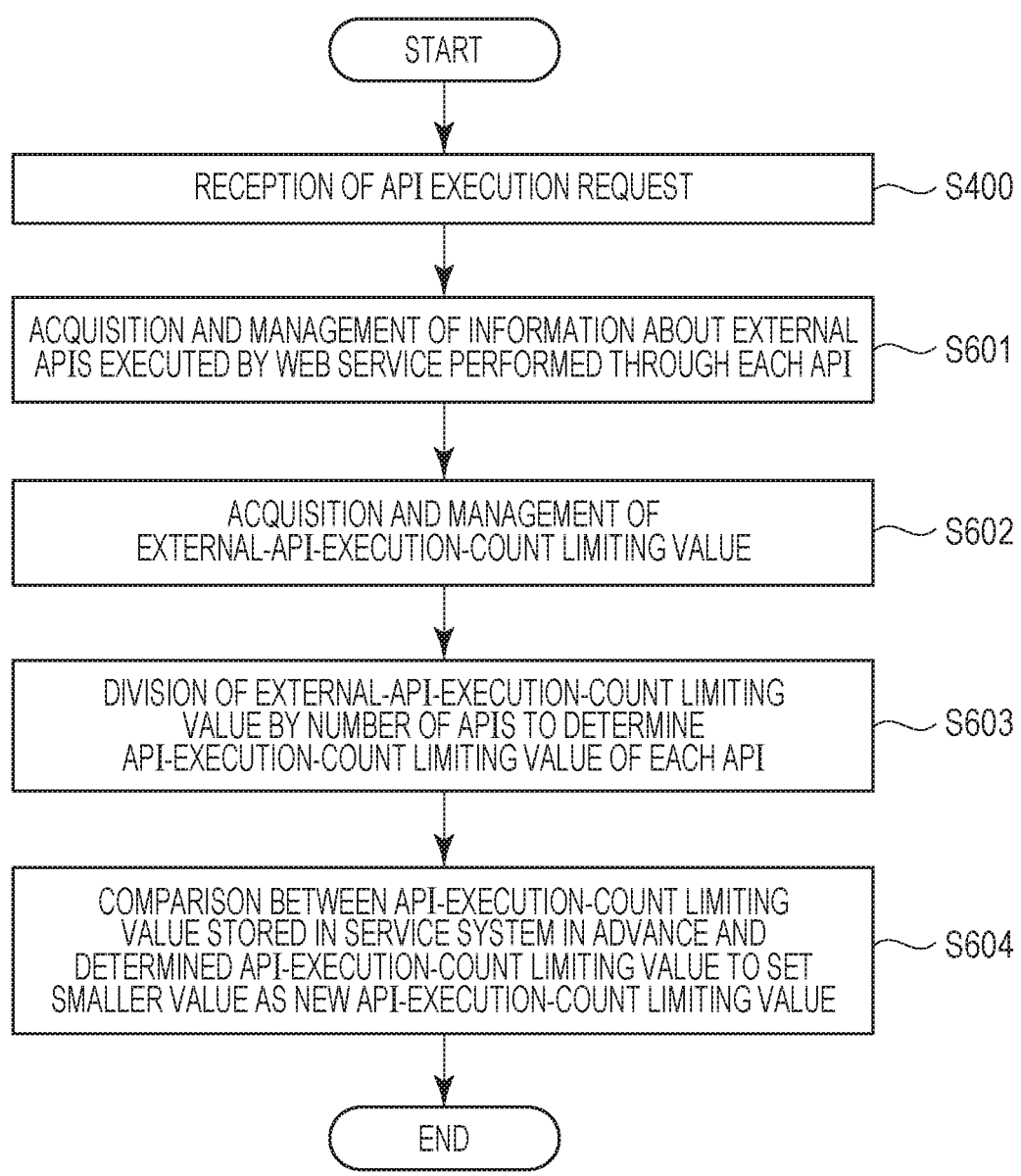
FIG. 6 is a flow chart illustrating the flow of processes according to a second embodiment of the present invention.

The flow in FIG. 6 begins when each virtual server 302 starts, when each virtual server 302 receives an API execution request from the client system 110 or the terminal 130, or when each virtual server 302 periodically performs the flow in FIG. 6. In an example in FIG. 6, the flow begins when the API execution request is received at S400.

At S601, the API execution control module 301 acquires and manages information about external APIs executed by the web service performed through each API. In this example, information about the external APIs executed by the resource service 401 performed through each API is acquired. Specifically, the API execution control module 301 acquires and manages information about the execution of the external API 1 by the resource service 401 performed through the API 1, the execution of the external API 2 by the resource service 401 performed through the API 2, and the execution of the external API 3 by the resource service 401 performed through the API 3.

At S602, the API execution control module 301 acquires and manages the external-API-execution-count limiting value. This time, an external-API-execution-count limiting value of "600" is acquired by the API execution control module 301 and managed by the API execution control module 301 as illustrated in Table 9.

TABLE 9

External-API-Execution-Count Limiting Value

| EXTERNAL API | EXTERNAL-API-EXECUTION-COUNT LIMITING VALUE |
|---|---|
| API 1 + API 2 + API 3 | 600 |

At S603, the API execution control module 301 divides the external-API-execution-count limiting value by the number of the APIs to calculate the API-execution-count limiting value. The calculation of the API-execution-count limiting value of each API is not limited to a method of using the external-API-execution-count limiting value acquired at S602 as the external-API-execution-count limiting value as it is. The method may set the value such that the external APIs are executable after the external APIs are executed a number of times that exceeds the external-API-execution-count limiting value. This time, the latter method is used, and the external-API-execution-count limiting value is "450", which is 75% of the external-API-execution-count limiting value. The percentage when the external-API-execution-count limiting value is set may not be 75%. The same is true for the embodiments described later. This time, the resource service 401 releases the three APIs, and the number of the APIs is "3". An external-API-execution-count limiting value of "450" is divided by "3", which is the number of the APIs, and the API-execution-count limiting value of each API is determined to be a calculated value of "150".

At S604, the API-execution-count limiting value stored in the service system in advance and the calculated API-execution-count limiting value are compared to set a smaller value as the new API-execution-count limiting value. This time, the API-execution-count limiting value (Table 1) stored in the API execution control module 301 of the service system 140 and an API-execution-count limiting value of "150" of each API that is calculated at S603 are compared to set a smaller value as the new API-execution-count limiting value. Table 10 illustrates the result after the comparison at S604.

TABLE 10

API-Execution-Count Limiting Value

| API | API-EXECUTION-COUNT LIMITING VALUE |
|---|---|
| API 1 | 100 |
| API 2 | 50 |
| API 3 | 100 |

The API-execution-count limiting value illustrated in Table 1 and the calculated result at S603 are compared in consideration for the limiting value of the DB server 305. In the case where the DB server 305 is not used, an API-execution-count limiting value of "150" obtained at S603 may be set as the new API-execution-count limiting value. Even when the API-execution-count limiting value exceeds the API-execution-count limiting value in Table 1, at least an unusable state of the external web service 402 as penalty does not occur in the case where the API execution count does not exceed the API-execution-count limiting value (S603) that takes the external-API-execution-count limiting value into account. Accordingly, a step of comparing the API-execution-count limiting value calculated at S603 with the value in Table 1 is not essential. In the case where the API-execution-count limiting value of some APIs that use the DB server 305 is set, it is only necessary to make the comparison with the value in Table 1 only when the API-execution-count limiting value is set. The same is true for the embodiments described later.

In addition to the case (referred to below as a first pattern) where the external-API-execution-count limiting value is represented by the sum of those of the external APIs released by the service system 120 as illustrated in Table 9, a case (referred to below as a second pattern) where the external-API-execution-count limiting value is set for each of external APIs can be also thought. A method of setting the new API-execution-count limiting value in the second pattern will be described with reference to FIG. 6 and FIG. 11A. This time as an example, the client service 400 executes the APIs. However, it can be thought that the function of the web browser implemented by the terminal 130 executes the APIs. This time, the second pattern is implemented in a manner in which S603 in FIG. 6 is replaced as described later.

S400 and S601 obtain the same result in the same manner as in the case of the first pattern according to the second embodiment, and a detailed description thereof is omitted.

At S602, the API execution control module 301 acquires and manages information about the external APIs executed by the resource service 401 performed through each API. Specifically, the API execution control module 301 acquires the external-API-execution-count limiting value of the external API 1, the external API 2, and the external API 3, sets "200" as the external-API-execution-count limiting value, and manages the information as illustrated in Table 11.

TABLE 11

External-API-Execution-Count Limiting Value

| EXTERNAL API | EXTERNAL-API-EXECUTION-COUNT LIMITING VALUE |
|---|---|
| EXTERNAL API 1 | 200 |
| EXTERNAL API 2 | 200 |
| EXTERNAL API 3 | 200 |

In place of S603 described above, the external-API-execution-count limiting value of each external API is set as the API-execution-count limiting value. The API-execution-count limiting value is determined to be "150", which is 75% of the external-API-execution-count limiting value (see Table 11) acquired at S602. The percentage at which the limiting value is set may not be 75%. In the case of the second pattern, the external-API-execution-count limiting value of each external API is determined in advance. Accordingly, it is not necessary to divide the external-API-execution-count limiting value by the number of the APIs to calculate the API-execution-count limiting value of each API as in the case of S603. S604 obtains the same result (see Table 10) in the same manner as the first pattern according to the second embodiment.

The API-execution-count limiting value per virtual server 302 is obtained in a manner in which the API-execution-count limiting value (see Table 10) set according to the second embodiment is divided by the number of the virtual servers 302. In the case where there are two virtual servers 302, according to the second embodiment, the API-execution-count limiting value (see Table 10) obtained at S604 is divided by "2", which the number of the virtual servers 302. The API-execution-count limiting value of the API 1 and the API 3 per virtual server is an obtained value of "50", and the API-execution-count limiting value of the API 2 per virtual server is an obtained value of "25".

However, the method of determining the API-execution-count limiting value is not limited to this calculation method. Unequal API-execution-count limiting values may be assigned to the virtual servers 302 and may be set as new API-execution-count limiting values. When unequal API-execution-count limiting values are assigned, at least an API-execution-count limiting value of 1 or more is assigned to each virtual server 302.

According to the second embodiment, the API-execution-count limiting value per virtual server can be set in accordance with the external-API-execution-count limiting value regardless of whether the virtual servers 302 have the auto scaling function. This method enables the function of each API to execute the corresponding external API, prevents the external web service 402 to stop due to the external-API-execution-count limiting value, and prevents the resource service 401 to stop due to the penalty. In the case where the external-API-execution-count limiting value is changed, the API-execution-count limiting value can be automatically changed, and the proper value thereof can be maintained.

In the cases considered according to embodiments beyond a third embodiment, when the function of the web browser implemented by the client service 400 or the terminal 130 executes an API once, the resource service 401 performed through the API may execute an external API more than once. In this case, the execution count is referred to as the "external API execution count per API execution count" (how many times the function of the web browser implemented by the client service 400 or the terminal 130 executes the API is referred to as the "API execution count", and how many times the resource service 401 performed through the API executes the external API is referred to as the "external API execution count".)

According to the second embodiment, the external API execution count per API execution count is once. In the case where an external-API-execution-count limiting value of "200" set according to the second embodiment is used when the external API execution count per API execution count is "2" or more, the external API execution count becomes "400" or more, and the external-API-execution-count limiting value exceeds "200" even when the API execution count is "200". As a result, the service system 120 becomes unusable, the API that uses the external API also becomes unusable due to the penalty, and the service system 140 stops. For this reason, it is necessary for the API-execution-count limiting value to be set in consideration for the external API execution count per API execution count.

Figure 10B:
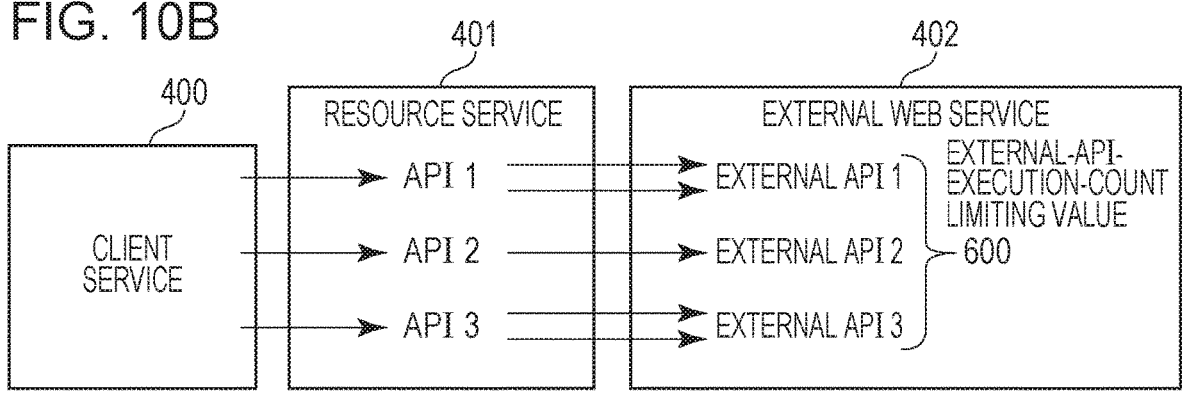

Regarding the first pattern, a method of setting the API-execution-count limiting value will be described with reference to FIG. 8. The API 1, the API 2, and the API 3 executed by the client service 400 perform the resource service 401, and the resource service 401 executes the external API 1, the external API 2, and the external API 3. FIG. 10B illustrates an image view thereof.

Figure 8:
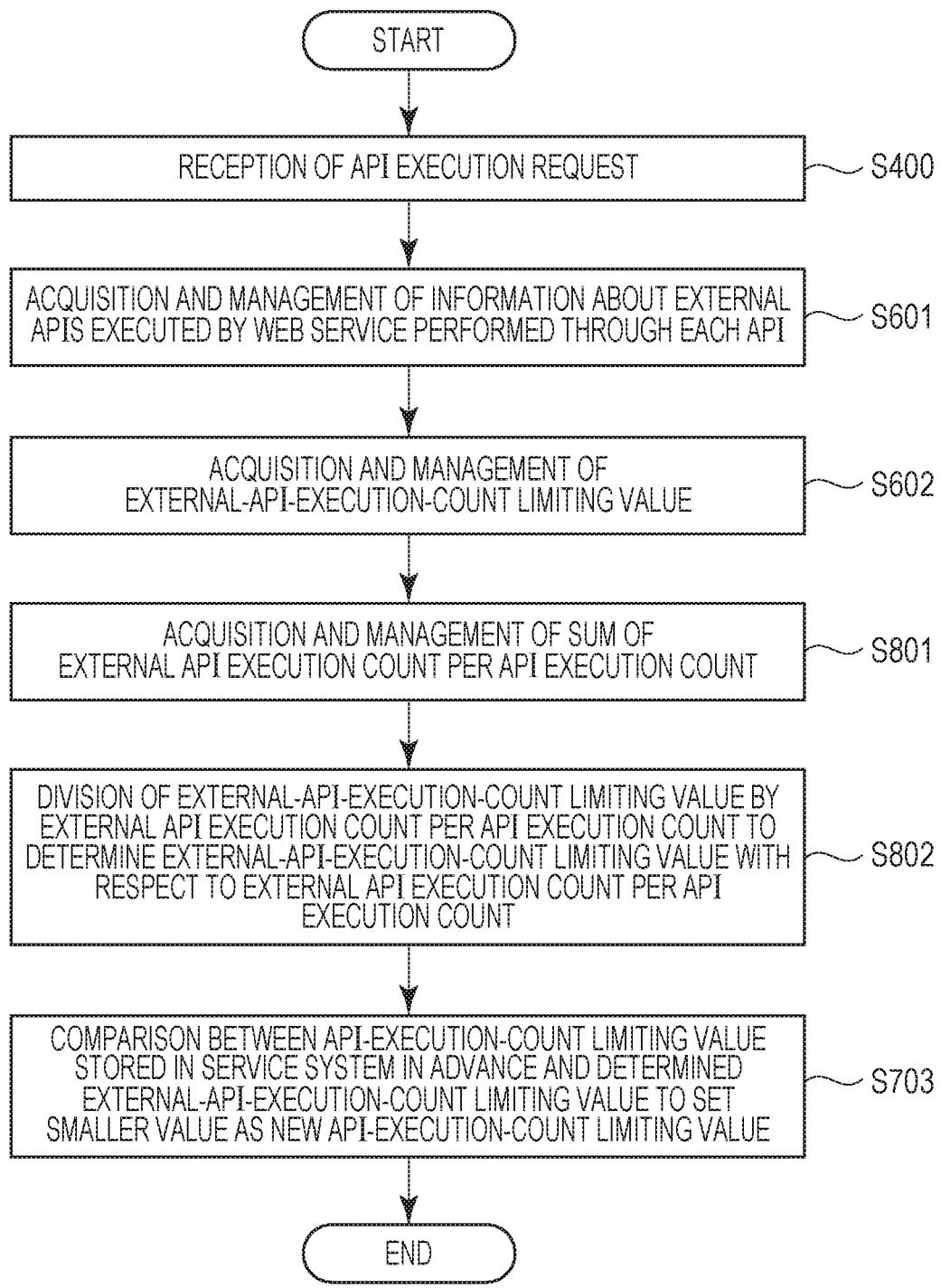
FIG. 8 is a flow chart illustrating the flow of processes (first pattern) according to the third and fourth embodiments of the present invention.

The flow in FIG. 8 begins when each virtual server 302 starts, when each virtual server 302 receives an API execution request from the client system 110 or the terminal 130, or when each virtual server 302 periodically performs the flow in FIG. 8. In an example in FIG. 8, the flow begins when the API execution request is received at S400.

S601 is obtained in the same manner as in the case of the first pattern according to the second embodiment, and a detailed description thereof is omitted. This time, the resource service 401 executed by the API 1 executes the external API 1 twice, the resource service 401 executes the external API 2 once in the case of the API 2, and the resource service 401 executes the external API 3 twice in the case of the API 3. The API execution control module 301 acquires and manages information about these.

At S602, the API execution control module 301 acquires and manages the external-API-execution-count limiting value. Specifically, an external-API-execution-count limiting value of "600" is acquired by the API execution control module 301, and the same information (see Table 9) as in the case of the first pattern according to the second embodiment is managed by the API execution control module 301.

At S801, the API execution control module 301 acquires and manages the sum of the external API execution count per API execution count. This time, the sum of the external API execution count of the API 1, the API 2, and the API 3 per API execution count is 5 times, and the API execution control module 301 manages the sum of the external API execution count per API execution count as illustrated in Table 12.

TABLE 12

Sum of External API Execution Count per API Execution Count

| API | SUM OF EXTERNAL API EXECUTION COUNT PER API EXECUTION COUNT |
|---|---|
| API 1 + API 2 + API 3 | 5 |

At S802, the API execution control module 301 divides the external-API-execution-count limiting value by the external API execution count per API execution count to calculate the external-API-execution-count limiting value with respect to the external API execution count per API execution count. Specifically, the external-API-execution-count limiting value (see Table 9) acquired at S602 is divided by the sum (see Table 12) of the external API execution count per API execution count acquired at S801 to calculate the external-API-execution-count limiting value with respect to the external API execution count per API execution count. At this time, the external-API-execution-count limiting value acquired at S602 may be used as the external-API-execution-count limiting value as it is. The value may be set such that the external APIs are executable after the external APIs are executed a number of times that exceeds the external-API-execution-count limiting value. This time, the latter method is used, and the external-API-execution-count limiting value is "450", which is 75% of the external-API-execution-count limiting value. A value of "450" is divided by "5", which is the sum of the external API execution count per API execution count, and the external-API-execution-count limiting value with respect to the external API execution count per API execution count is determined to be an obtained value of "90". Consequently, the API execution control module 301 sets the external-API-execution-count limiting value as illustrated in Table 13.

TABLE 13

External-API-Execution-Count Limiting Value with respect to External API Execution Count per API Execution Count

| | EXTERNAL-API-EXECUTION-COUNT LIMITING VALUE |
|---|---|
| EXTERNAL API | 90 |

At S703, the API-execution-count limiting value stored in the service system in advance and the external-API-execution-count limiting value are compared to set a smaller value as the new API-execution-count limiting value. This time, the API-execution-count limiting value (see Table 1) stored in the API execution control module 301 and the external-API-execution-count limiting value (see Table 13) calculated at S802 are compared. Table 14 illustrates the result.

TABLE 14

New API-Execution-Count Limiting Value

| API | API-EXECUTION-COUNT LIMITING VALUE |
|---|---|
| API 1 | 90 |
| API 2 | 50 |
| API 3 | 90 |

The API-execution-count limiting value illustrated in Table 1 and the calculated result at S802 are compared in consideration for the limiting value of the DB server 305. In the case where the DB server 305 is not used, an API-execution-count limiting value of "90" obtained at S802 may be set as the API-execution-count limiting value of each API. The same is true for the embodiments described later.

A method of setting the API-execution-count limiting value in the second pattern of the third embodiment will now be described with reference to FIG. 7 and FIG. 11B. This time as an example, the client service 400 executes the APIs.

However, it can be thought that the function of the web browser implemented by the terminal 130 executes the APIs.

Figure 7:
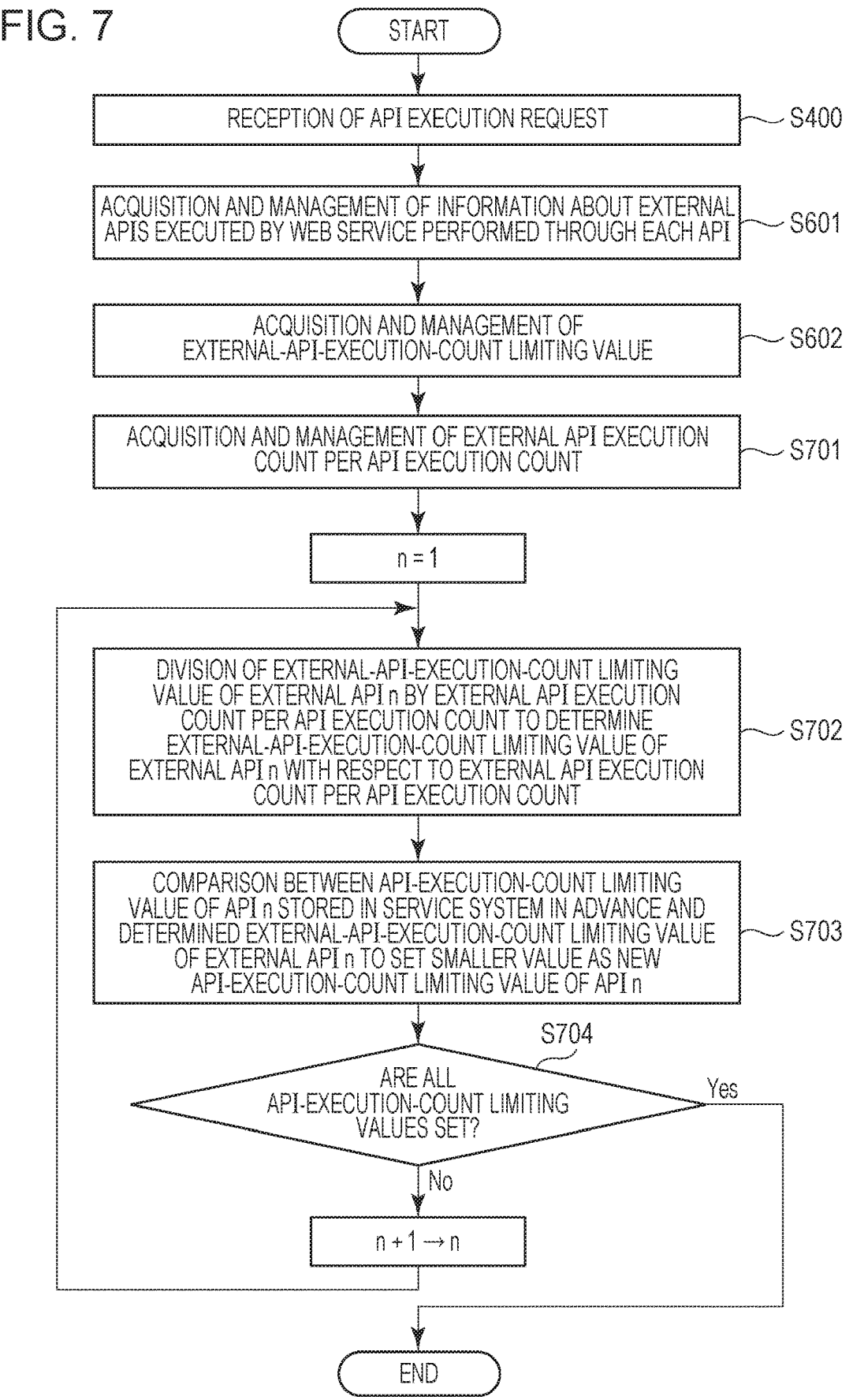
FIG. 7 is a flow chart illustrating the flow of processes (second pattern) according to a third embodiment of the present invention.

The flow in FIG. 7 begins when each virtual server 302 starts, when each virtual server 302 receives an API execution request from the client system 110 or the terminal 130, or when each virtual server 302 periodically performs the flow in FIG. 7. In an example in FIG. 7, the flow begins when the API execution request is received at S400.

S601 obtains the same result in the same manner as in the case of the first pattern according to the third embodiment, and a description thereof is omitted.

At S602, the API execution control module 301 acquires and manages the external-API-execution-count limiting value. This time, the API execution control module 301 acquires the external-API-execution-count limiting value of the external API 1, the external API 2, and the external API 3, and "200" is set as the external-API-execution-count limiting value. The same information (see Table 11) as in the case of the second pattern according to the second embodiment is managed by the API execution control module 301.

At S701, the API execution control module 301 acquires and manages the external API execution count per API execution count. This time, the resource service 401 performed through the API 1 executes the external API 1 twice, the resource service 401 executes the external API 2 once in the case of the API 2, and the resource service 401 executes the external API 3 twice in the case of the API 3, and the API execution control module 301 manages the external API execution count per API execution count as illustrated in Table 15.

TABLE 15

External API Execution Count per API Execution Count

| | EXTERNAL API 1 | EXTERNAL API 2 | EXTERNAL API 3 |
|---|---|---|---|
| API 1 | 2 | | |
| API 2 | | 1 | |
| API 3 | | | 2 |

At S702, the external-API-execution-count limiting value of an external API n is divided by the external API execution count per API execution count to calculate the external-API-execution-count limiting value of the external API n with respect to the external API execution count per API execution count. At this time, the API-execution-count limiting value is "150", which is 75% of the external-API-execution-count limiting value (see Table 10) acquired at S602 as in the above embodiment. In the case of the API 1 (n=1), an external-API-execution-count limiting value of "150" of the external API 1 obtained at S602 is divided by "2", which is the external API execution count per API execution count obtained at S701, and the API-execution-count limiting value of the API 1 with respect to one execution count of the external API executed by the resource service 401 performed through the API 1 is determined to be an obtained value of "75".

S703 is the same process as in the first pattern according to the third embodiment, and a description thereof is omitted. In the case of the API 1, an API-execution-count limiting value of "100" of the API 1 stored in the API execution control module 301 and an API-execution-count limiting value of "75" of the API 1 set at S702 are compared to set a smaller value of "75" as the new API-execution-count limiting value of the API 1.

At S704, whether the API-execution-count limiting values of all APIs are set is decided. The processes of S702 to S704 are repeated until all the API-execution-count limiting values are decided to be set. Table 16 illustrates the API-execution-count limiting values set in the second pattern according to the third embodiment.

TABLE 16

New API-Execution-Count Limiting Value

| API | API-EXECUTION-COUNT LIMITING VALUE |
|---|---|
| API 1 | 75 |
| API 2 | 50 |
| API 3 | 75 |

The new API-execution-count limiting value per virtual server 302 is obtained in a manner in which the API-execution-count limiting value (see Table 14 and Table 16) set according to the third embodiment is divided by the number of the virtual servers 302. In the case where there are two virtual servers 302, in the first pattern according to the third embodiment, the API-execution-count limiting value in Table 14 is divided by "2", which the number of the virtual servers 302. The API-execution-count limiting value of the API 1 and the API 3 per virtual server is an obtained value of "45", and the API-execution-count limiting value of the API 2 per virtual server is an obtained value of "25".

In the second pattern according to the third embodiment, the API-execution-count limiting value in Table 16 is divided by "2", which the number of the virtual servers 302. The API-execution-count limiting value of the API 1 and the API 3 per virtual server is an obtained value of "37", and the API-execution-count limiting value of the API 2 per virtual server is an obtained value of "25". The remainder when the API-execution-count limiting value of the API 1 and the API 3 per virtual server is calculated may be distributed to any one of the virtual servers 302.

The method of determining the API-execution-count limiting value is not limited to this calculation method. Unequal API-execution-count limiting values may be assigned to the virtual servers 302 and may be set as new API-execution-count limiting values. When unequal API-execution-count limiting values are assigned, at least an API-execution-count limiting value of 1 or more is assigned to each virtual server 302.

According to the third embodiment, the API-execution-count limiting value per virtual server can be set in accordance with how many times the resource service 401 performed through each API executes the corresponding external API regardless of whether the virtual servers 302 have the auto scaling function. This method enables the function of each API to execute the corresponding external API, prevents the resource service 401 and the external web service 402 to stop due to the external-API-execution-count limiting value. In the case where the external-API-execution-count limiting value is changed, the API-execution-count limiting value can be automatically changed, and the proper value thereof can be maintained.

The following description illustrates a fourth embodiment in which the API-execution-count limiting value is set in the case where the resource service 401 performed through each API executes external APIs.

Figure 10C:
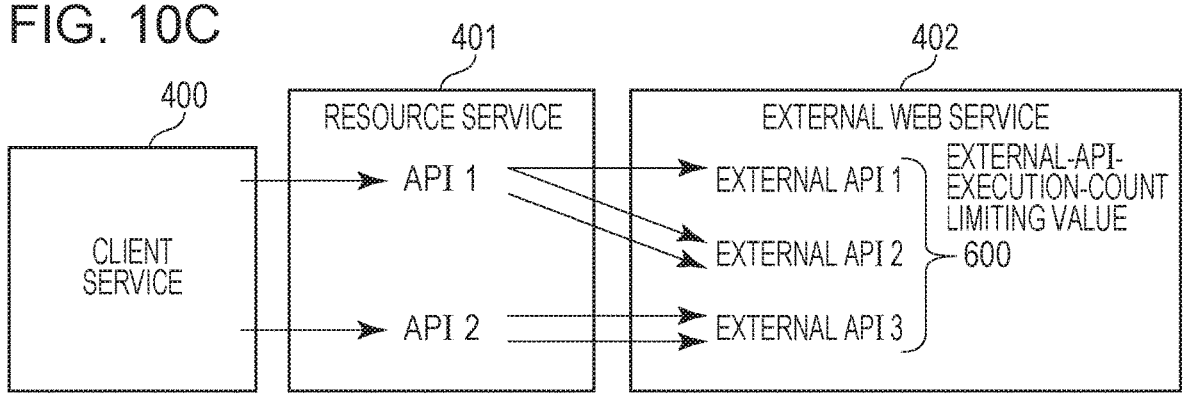

Regarding the first pattern, the method of setting the API-execution-count limiting value will be described with reference to FIG. 8. The API 1 and the API 2 executed by the client service 400 perform the resource service 401, and the resource service 401 executes the external API 1, the external API 2, and the external API 3. FIG. 10C illustrates an image view thereof. This time as an example, the client service 400 executes the APIs. However, it can be thought that the function of the web browser implemented by the terminal 130 executes the APIs.

The flow in FIG. 8 begins when each virtual server 302 starts, when each virtual server 302 receives an API execution request from the client system 110 or the terminal 130, or when each virtual server 302 periodically performs the flow in FIG. 8. In the example in FIG. 8, the flow begins when the API execution request is received at S400.

At S601, the API execution control module 301 acquires information about the external APIs that are called and executed by the web service performed through each API. This time, the resource service 401 performed through the API 1 executes the external API 1 once and executes the external API 2 twice, and the resource service 401 executes the external API 3 twice in the case of the API 2.

At S602, the API execution control module 301 acquires and manages the external-API-execution-count limiting value. This time, an external-API-execution-count limiting value of "600" is acquired by the API execution control module 301, and the same information (see Table 9) as in the case of the first pattern according to the second embodiment is managed by the API execution control module 301.

At S801, the API execution control module 301 acquires and manages the sum of the external API execution count per API execution count. This time, the resource service 401 performed through the API 1 and the API 2 executes the external API 5 times in total. Consequently, the management of the API execution control module 301 is as illustrated in Table 17.

TABLE 17

Sum of External API Execution Count per API Execution Count

| API | EXTERNAL API EXECUTION COUNT PER API EXECUTION COUNT |
|---|---|
| API 1 + API 2 | 5 |

S802 obtains the same result (see Table 13) in the same manner as in the case of the first pattern according to the third embodiment. Subsequently, at S703, the API-execution-count limiting value stored in the service system in advance and the external-API-execution-count limiting value are compared to set a smaller value as the new API-execution-count limiting value. This time, the API-execution-count limiting value (see Table 1) stored in the API execution control module 301 and the external-API-execution-count limiting value calculated at S802 are compared to set a smaller value as the new API-execution-count limiting value. Table 18 illustrates the result after the comparison.

TABLE 18

New API-Execution-Count Limiting Value

| API | API-EXECUTION-COUNT LIMITING VALUE |
|---|---|
| API 1 | 90 |
| API 2 | 50 |

The API-execution-count limiting value illustrated in Table 1 and the calculated result at S802 are compared in consideration for the limiting value of the DB server 305. In the case where the DB server 305 is not used, the external-API-execution-count limiting value obtained at S802 may be set as the API-execution-count limiting value.

The method of setting the API-execution-count limiting value in the second pattern of the fourth embodiment will be described with reference to FIG. 9 and FIG. 11C. This time as an example, the client service 400 executes the APIs. However, it can be thought that the function of the web browser implemented by the terminal 130 executes the APIs.

Figure 9:
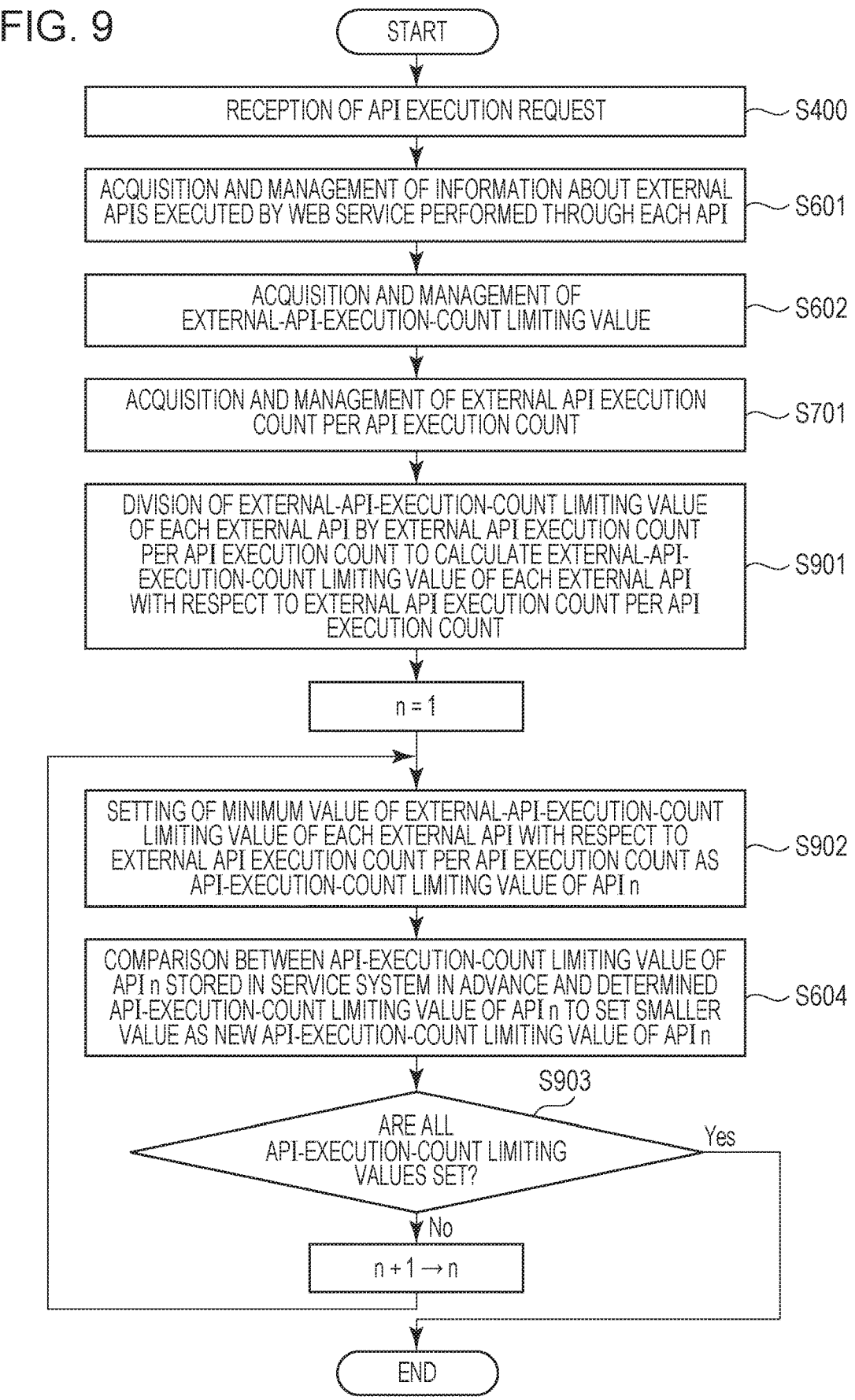
FIG. 9 is a flow chart illustrating the flow of processes (second pattern) according to the fourth embodiment and the other embodiment of the present invention.

The flow in FIG. 9 begins when each virtual server 302 starts, when each virtual server 302 receives an API execution request from the client system 110 or the terminal 130, or when each virtual server 302 periodically performs the flow in FIG. 9. In an example in FIG. 9, the flow begins when the API execution request is received at S400.

S601 obtains the same result in the same manner as in the case of the first pattern according to the fourth embodiment, and a description thereof is omitted.

At S602, the API execution control module 301 acquires and manages the external-API-execution-count limiting value. This time, the API execution control module 301 acquires the external-API-execution-count limiting value of the external API 1, the external API 2, and the external API 3, and "200" is set as the external-API-execution-count limiting value. The same information (see Table 11) as in the case of the second pattern according to the second embodiment is managed by the API execution control module 301.

At S701, the API execution control module 301 acquires and manages the external API execution count per API execution count. This time, the resource service 401 performed through the API 1 executes the external API 1 once and executes the external API 2 twice, and the resource service 401 executes the external API 3 twice in the case of the API 2, and the API execution control module 301 manages the external API execution count per API execution count as illustrated in Table 19.

TABLE 19

External API Execution Count per API Execution Count

| | EXTERNAL API 1 | EXTERNAL API 2 | EXTERNAL API 3 |
|---|---|---|---|
| API 1 | 1 | 2 | |
| API 2 | | | 2 |

At S901, the external-API-execution-count limiting value of each external API is divided by the external API execution count per API execution count to calculate the external-API-execution-count limiting value of each external API with respect to the external API execution count per API execution count. This time, the external-API-execution-count limiting value acquired at S602 and the external API execution count per API execution count acquired at S701 are used to calculate the external-API-execution-count limiting value of each external API with respect to the external API execution count per API execution count. In the calculation, the API-execution-count limiting value is "150", which is 75% of the external-API-execution-count limiting value acquired at S602. Specifically, the external API 1 is executed once by the resource service 401 performed by the API 1, and the external-API-execution-count limiting value of the external API 1 with respect to the external API execution count per API execution count is an external-API-execution-count limiting value of "150" set at S602. The external API 2 is executed twice by the resource service 401 performed by the API 1, and the external-API-execution-count limiting value of the external API 2 with respect to the external API execution count per API execution count is "75", which is obtained by dividing an external-API-execution-count limiting value of "150" set at S602 by "2", which is the external API execution count per API execution count. Table 20 illustrates the external-API-execution-count limiting value with respect to the external API execution count per API execution count that is set in the API execution control module 301.

TABLE 20

External-API-Execution-Count Limiting Value with respect to External API Execution Count per API Execution Count

| EXTERNAL API | EXTERNAL-API-EXECUTION-COUNT LIMITING VALUE |
|---|---|
| EXTERNAL API 1 | 150 |
| EXTERNAL API 2 | 75 |
| EXTERNAL API 3 | 75 |

At S902, the minimum value of the external-API-execution-count limiting value of each external API with respect to the external API execution count per API execution count is set as the API-execution-count limiting value of the API n. Specifically, in the case of the API 1 (n=1), the resource service 401 performed by the API 1 executes the external API 1 and the external API 2, and "150" and "75", which are the calculation result (see Table 20) at S901 are compared to set a smaller value of "75" as the API-execution-count limiting value of the API 1.

S604 is the same process as in the first pattern according to the fourth embodiment, and a description thereof is omitted. In the case of the API 1, an API-execution-count limiting value of "100" of the API 1 stored in the API execution control module 301 and an API-execution-count limiting value of "75" of the API 1 set at S902 are compared to set a smaller value of "75" as the API-execution-count limiting value of the API 1.

At S903, whether the API-execution-count limiting values of all APIs are set is decided. The processes of S902 to S903 are repeated until all the API-execution-count limiting values are decided to be set. Table 21 illustrates the API-execution-count limiting values set in the second pattern according to the fourth embodiment.

TABLE 21

API-Execution-Count Limiting Value

| API | API-EXECUTION-COUNT LIMITING VALUE |
|---|---|
| API 1 | 75 |
| API 2 | 50 |

Figure 10D:
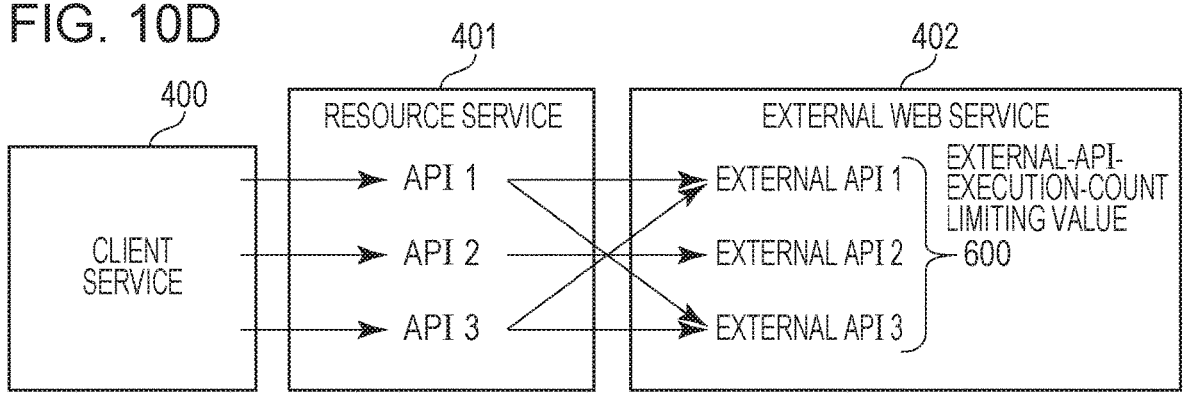

According to the fourth embodiment, the resource service 401 performed through different APIs does not execute the same external API. In another embodiment described below, the resource service 401 performed through some APIs executes the same external API, and the API-execution-count limiting value is set. Specifically, as illustrated in FIG. 10D and FIG. 11D, the resource service 401 performed through the APIs executes one external API.

Regarding the first pattern (see FIG. 10D) of the other embodiment, the API-execution-count limiting value is set with reference to FIG. 8 as in the case of FIG. 10B and FIG. 10C. According to the third embodiment in the first pattern (see FIG. 10B) and the present embodiment, the external- API-execution-count limiting value, the sum of the external API execution count per API execution count, and the number of the APIs are the same. For this reason, the same result (see Table 14) as the first pattern according to the third embodiment is obtained regardless of whether the same external API is executed. Accordingly, a description of the method of setting the API-execution-count limiting value in the case of FIG. 10D is omitted.

Regarding the second pattern (see FIG. 11D) of the other embodiment, the API-execution-count limiting value is set with reference to FIG. 9 as in the case of the second pattern (FIG. 11C) according to the fourth embodiment. Accordingly, a detailed description of the same steps as in the case of FIG. 11C is omitted, and steps (S701 and S901) that obtain different results are described below.

At S701, the API execution control module 301 acquires and manages the external API execution count per API execution count. This time, from FIG. 11D, the API execution control module 301 manages the external API execution count per API execution count as illustrated in Table 22.

TABLE 22

External API Execution Count per API Execution Count

| | EXTERNAL API 1 | EXTERNAL API 2 | EXTERNAL API 3 |
|---|---|---|---|
| API 1 | 1 | | 1 |
| API 2 | | 1 | |
| API 3 | 1 | | 1 |

At S901, the external-API-execution-count limiting value of each external API with respect to the external API execution count per API execution count is calculated. This time, the external-API-execution-count limiting value (see Table 11) acquired at S602 and the external API execution count per API execution count acquired at S701 are used to calculate the external-API-execution-count limiting value of each external API with respect to the external API execution count per API execution count. The external-API-execution-count limiting value is "150", which is 75% of an external-API-execution-count limiting value of "200", as in the above embodiments.

In FIG. 11D, the external API 1 is executed twice by the resource service 401 performed through the API 1 and the API 3, and the external-API-execution-count limiting value of the external API 1 with respect to the external API execution count per API execution count is "75", which is obtained by dividing an external-API-execution-count limiting value of "150" by "2", which is the sum of the external API execution count per API execution count. The external API 3 is executed twice by the resource service 401 performed through the API 1 and the API 3, and the external-API-execution-count limiting value of the external API 3 with respect to the external API execution count per API execution count is "75", which is obtained by dividing an external-API-execution-count limiting value of "150" by "2", which is the sum of the external API execution count per API execution count. The external API 2 is executed once by the resource service 401 performed through the API 2, and the external-API-execution-count limiting value of the external API 2 with respect to the external API execution count per API execution count is "150", which is obtained by dividing an external-API-execution-count limiting value of "150" set at S602 by "1", which is the sum of the external API execution count per API execution count. Table 23 illustrates the external-API-execution-count limiting value of each external API with respect to the external API execution count per API execution count. The value in Table 23 is set in the API execution control module 301.

TABLE 23

External-API-Execution-Count Limiting Value with respect to External API Execution Count per API Execution Count

| EXTERNAL API | EXTERNAL-API-EXECUTION-COUNT LIMITING VALUE |
|---|---|
| EXTERNAL API 1 | 75 |
| EXTERNAL API 2 | 150 |
| EXTERNAL API 3 | 75 |

The processes of S902 to S903 are repeated until all the API-execution-count limiting values are decided to be set at S903. Consequently, the API-execution-count limiting value set according to the embodiment illustrated in FIG. 11D is the same as in the case of the second pattern (see Table 16) according to the third embodiment.

The API-execution-count limiting value per virtual server 302 is obtained in a manner in which the API-execution-count limiting value (see Table 16) set according to the fourth embodiment is divided by the number of the virtual servers 302.

For example, there are two virtual servers 302. The calculation result according to the fourth embodiment is divided by "2", which is the number of the virtual servers 302, and the API-execution-count limiting value per virtual server 302 is determined to be the obtained value. In the case of the first pattern (see FIG. 10C) according to the fourth embodiment, the API-execution-count limiting value in Table 18 is divided by "2", which is the number of the virtual servers 302, the API-execution-count limiting value of the API 1 per virtual server is an obtained value of "45", and the API-execution-count limiting value of the API 2 per virtual server is an obtained value of "25". In the case where the API-execution-count limiting value cannot be divided by the number of the virtual servers 302, a remainder thereof may be distributed to any one of the virtual servers 302. The same is true for the other pattern.

The method of determining the API-execution-count limiting value is not limited to this calculation method. Unequal API-execution-count limiting values may be assigned to the virtual servers 302 and may be set as new API-execution-count limiting values. When unequal API-execution-count limiting values are assigned, at least an API-execution-count limiting value of 1 or more is assigned to each virtual server 302.

According to the fourth embodiment, the API-execution-count limiting value per virtual server can be set regardless of whether the virtual servers 302 have the auto scaling function even in the case where the resource service 401 performed by one API executes the external APIs and in the case where the resource service 401 performed by the APIs executes one external API. This method enables the function of each API to execute the corresponding external APIs, prevents the external web service 402 to stop due to the external-API-execution-count limiting value, and prevents the resource service 401 to stop due to the penalty. In the case where the external-API-execution-count limiting value is changed, the API-execution-count limiting value can be automatically changed, and the proper value thereof can be maintained.

According to the above embodiments, the number of the APIs is two to three, and the number of the external APIs is three. However, the flow is effective also in the case where the number of the APIs, the number of the external APIs, and the external API execution count per API execution count, for example, vary from these values. Subject matters that are not described in the second to fourth embodiments are the same as in the first embodiment.

In the first pattern according to the third and fourth embodiments, the method of calculating the API-execution-count limiting value by using the flow chart in FIG. 8 is described. However, this method is not a limitation. The API-execution-count limiting value can be calculated in the same manner as described in the second pattern in FIG. 7 and FIG. 9 such that the external-API-execution-count limiting value is divided by the number of the APIs to set the external-API-execution-count limiting value first.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application No. 2016-241706 filed Dec. 13, 2016, which is hereby incorporated by reference herein in its entirety

What is claimed is:

1. A service system that implements a web service on N virtual servers, N being an integer greater than zero, and has the web service that provides a function corresponding to a predetermined API in response to a call, by a client service, of the predetermined API from among a plurality of APIs released for a purpose of using the web service, wherein, in response to a request received from the client service, at least one of the N virtual servers acquires data from a database server, processes the request using the acquired data, and implements the web service, comprising:
    a determining unit configured to determine a per-virtual-server API-execution-count limiting value on a basis of N and an API-execution-count limiting value, wherein the API-execution-count limiting value is a limit value set on the web service on a basis of an access limit imposed on the database server; and
    a controller that, without providing the web service, processes the call of the predetermined API as an error in a case where the API execution count is greater than the API-execution-count limiting value of the predetermined API,
    wherein N is changed in accordance with a load of the service system.

2. The service system according to claim 1, further comprising:
    an auto scaling function configured to change the N virtual servers in accordance with the load of the service system; and
    a checking unit configured to check the number of the virtual servers that is changed by the auto scaling function,
    wherein the determining unit is configured to determine a new API-execution-count limiting value per virtual server on a basis of the API-execution-count limiting value and the number of the virtual servers that is checked by the checking unit.

3. The service system according to claim 2,
    wherein the checking unit is configured to check the number of the virtual servers that is changed by the auto scaling function in response to the determining unit determining the new API-execution-count limiting value per virtual server.

4. The service system according to claim 2, further comprising:
    a manager that manages the N virtual servers that is changed by the auto scaling function of the service system and starts a new virtual server on which the web service is implemented in accordance with the load of the service system,
    wherein the checking unit is configured to query the manager for the number of the virtual servers to check the number of the virtual servers.

5. The service system according to claim 2,
    wherein the auto scaling function is configured to increase the N virtual servers in response to an increase in the load of the service system to a predetermined load or more and to decrease the number of the virtual servers in response to a decrease in the load of the service system to a predetermined load or less.

6. The service system according to claim 2,
    wherein the auto scaling function is configured to decide the load of the service system on a basis of at least one of a resource used by each of the N virtual servers and a job stored in a queue.

7. The service system according to claim 1,
    wherein the web service implemented by the service system releases a plurality of the APIs, and
    wherein the determining unit is configured to determine the API-execution-count limiting value per virtual server on a basis of N and the API-execution-count limiting value determined for each of the APIs.

8. The service system according to claim 7,
    wherein, in response to a specific API being called, the controller provides the web service or processes execution of the specific API as an error on a basis of the API-execution-count limiting value corresponding to the specific API that is determined by the determining unit.

9. The service system according to claim 1,
    wherein the web service is any one of an authentication and approval service that processes data related to authentication and approval, a business form service that processes data to create business form data, a print service that processes data to create print data, and a printer management service that manages information about a printer and that processes data to create report data.

10. The service system according to claim 1, wherein the determining unit is configured to determine the API-execution-count limiting value per virtual server in a manner in which the API-execution-count limiting value is divided by N.

11. The service system according to claim 1, wherein the determining unit is configured to determine the API-execution-count limiting value per virtual server in a manner in which a numerical value is assigned to each of the virtual servers, a total of the numerical values being equal to the API-execution-count limiting value.

12. The service system according to claim 1, further comprising:
a cooperating function configured to cooperate with another service system,
wherein the determining unit is configured to determine the API-execution-count limiting value per virtual server on a basis of an external-API-execution-count limiting value that is used to limit how many times the web service executes an external API released by an external web service provided by the other service system, the API-execution-count limiting value, and N.

13. The service system according to claim 12, wherein the determining unit is configured to calculate a new external-API-execution-count limiting value by dividing the external-API-execution-count limiting value by an external API execution count per API execution count, and to determine the API-execution-count limiting value per virtual server on a basis of the new external-API-execution-count limiting value, the API-execution-count limiting value, and N.

14. The service system according to claim 13, wherein the API execution count is a count of how many times the API is executed by the client service, and
wherein the external API execution count is a count of how many times the external API is executed by the web service.

15. A control method for implementing a web service on N virtual servers, N being an integer greater than zero, and having the web service that provides a function corresponding to a predetermined API in response to a call, by a client service, of the predetermined API from among a plurality of APIs released for a purpose of using the web service, wherein, in response to a request received from the client service, at least one of the N virtual servers acquires data from a database server, processes the request using the acquired data, and implements the web service, the method comprising:
determining a per-virtual-server API-execution-count limiting value on a basis of N and an API-execution-count limiting value, wherein the API-execution-count limiting value is a limit value set on the web service on a basis of an access limit imposed on the database server;
and
processing, without providing the web service, the call of the predetermined API as an error in a case where the API execution count is greater than the API-execution-count limiting value of the predetermined API,
wherein N is changed in accordance with a load of the service system.

16. A non-transitory storage medium storing instructions that when executed by one or more processors controls the one or more processors to implement a control method for implementing a web service on N virtual servers, N being an integer greater than zero, and having the web service that provides a function corresponding to a predetermined API in response to a call, by a client service, of the predetermined API from among a plurality of APIs released for a purpose of using the web service, wherein, in response to a request received from the client service, at least one of the N virtual servers acquires data from a database server, processes the request using the acquired data, and implements the web service, the method comprising:
determining a per-virtual-server API-execution-count limiting value on a basis of N and an API-execution-count limiting value, wherein the API-execution-count limiting value is a limit value set on the web service on a basis of an access limit imposed on the database server;
and
processing, without providing the web service, the call of the predetermined API as an error in a case where the API execution count is greater than the API-execution-count limiting value of the predetermined API,
wherein N is changed in accordance with a load of the service system.

* * * * *